United States Patent
Sasaki et al.

(10) Patent No.: US 10,407,092 B2
(45) Date of Patent: Sep. 10, 2019

(54) POWER STEERING APPARATUS AND CONTROL CIRCUIT FOR POWER STEERING APPARATUS

(71) Applicant: HITACHI AUTOMOTIVE SYSTEMS, LTD., Hitachinaka-shi, Ibaraki (JP)

(72) Inventors: Mitsuo Sasaki, Hadano (JP); Makoto Goto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 242 days.

(21) Appl. No.: 15/505,685

(22) PCT Filed: Aug. 31, 2015

(86) PCT No.: PCT/JP2015/074680
§ 371 (c)(1),
(2) Date: Feb. 22, 2017

(87) PCT Pub. No.: WO2016/047384
PCT Pub. Date: Mar. 31, 2016

(65) Prior Publication Data
US 2017/0274929 A1    Sep. 28, 2017

(30) Foreign Application Priority Data
Sep. 24, 2014    (JP) .................... 2014-193902

(51) Int. Cl.
*B62D 5/04* (2006.01)
*G01F 23/22* (2006.01)
*G01M 3/18* (2006.01)

(52) U.S. Cl.
CPC ............. *B62D 5/0487* (2013.01); *B62D 5/04* (2013.01); *B62D 5/0448* (2013.01); *B62D 5/0484* (2013.01); *G01F 23/223* (2013.01); *G01M 3/18* (2013.01)

(58) Field of Classification Search
CPC ...... B62D 5/04; B62D 5/0448; B62D 5/0487; B62D 5/0484
See application file for complete search history.

(56) References Cited

U.S. PATENT DOCUMENTS

| | | | |
|---|---|---|---|
| 9,796,409 B2 * | 10/2017 | Sasaki | B62D 5/049 |
| 2008/0243329 A1 | 10/2008 | Hamel et al. | |
| 2011/0218704 A1 | 9/2011 | Kanekawa et al. | |
| 2017/0274929 A1 * | 9/2017 | Sasaki | B62D 5/04 |
| 2017/0341679 A1 * | 11/2017 | Ikegaya | B62D 5/003 |

FOREIGN PATENT DOCUMENTS

| | | | |
|---|---|---|---|
| JP | 2004-161073 A | | 6/2004 |
| JP | 2004-243900 A | | 9/2004 |
| JP | 2004243900 A | * | 9/2004 |
| JP | 2006-111032 A | | 4/2006 |
| JP | 2008-254729 A | | 10/2008 |
| JP | 2011-183923 A | | 9/2011 |

* cited by examiner

*Primary Examiner* — Kevin Hurley
(74) *Attorney, Agent, or Firm* — Foley & Lardner LLP

(57) ABSTRACT

A power steering apparatus and a control circuit for a power steering apparatus are provided. The power steering apparatus detects an abnormality in the power steering apparatus based on whether there is a periodic change within a predetermined frequency range with respect to the number of rotations of an electric motor, a steering velocity, or a steering torque.

17 Claims, 13 Drawing Sheets

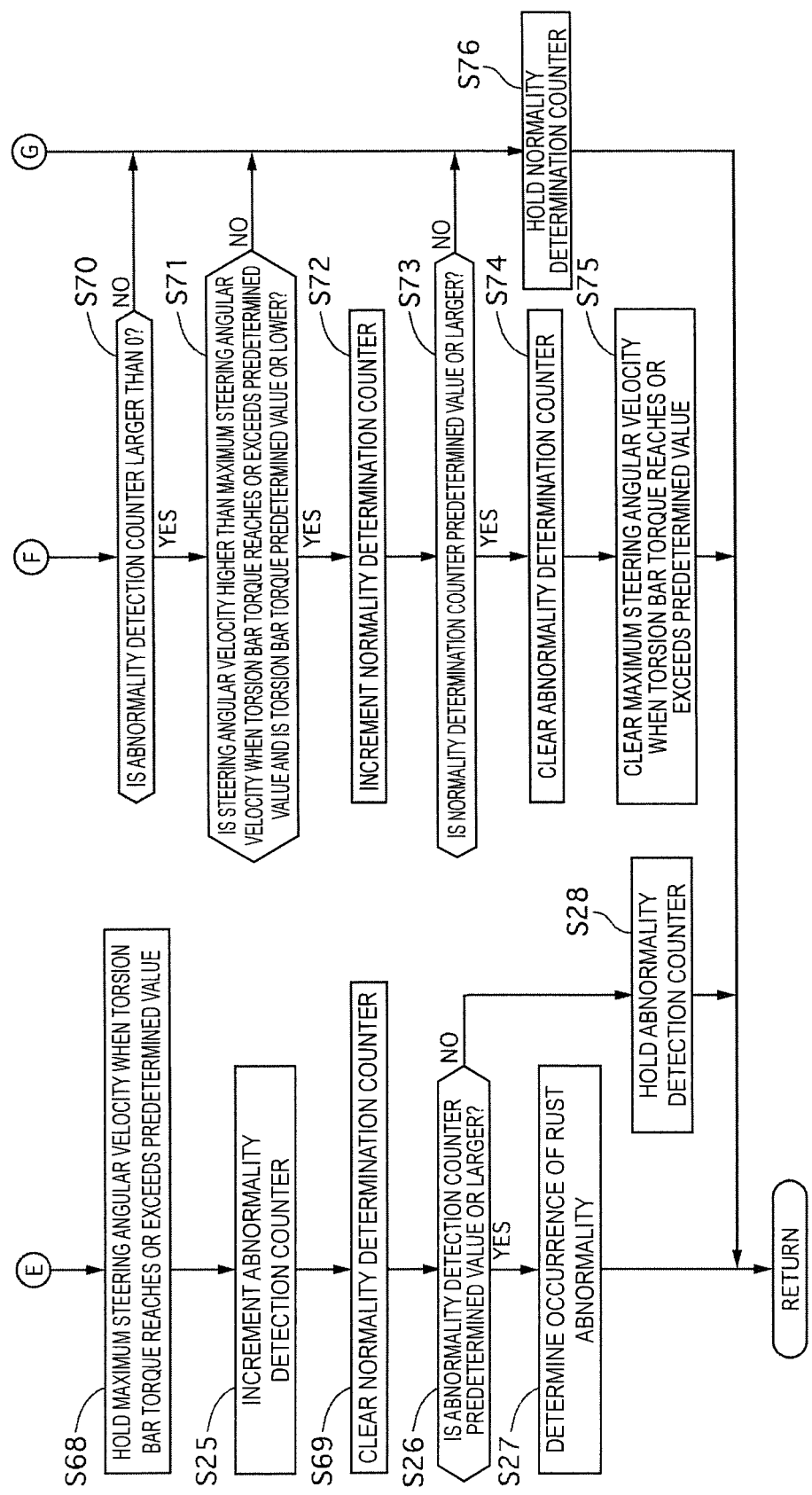

POWER STEERING APPARATUS AND CONTROL CIRCUIT FOR POWER STEERING APPARATUS

TECHNICAL FIELD

The present invention relates to a power steering apparatus and a control circuit for a power steering apparatus.

BACKGROUND ART

Conventional power steering apparatuses detect an abnormality in the apparatus by including a raindrop sensor in a housing containing a rack bar therein. One example relating to the above-described technique is discussed in PTL 1.

CITATION LIST

Patent Literature

PTL 1: Japanese Patent Application Public Disclosure No. 2006-111032

SUMMARY OF INVENTION

Technical Problem

There are needs desiring the above-described conventional apparatuses to become able to detect the abnormality in the apparatus without use of the sensor for detecting the abnormality.

An object of the present invention is to enable the power steering apparatus to detect the abnormality in the apparatus without use of the sensor for detecting the abnormality.

Solution to Problem

According to one aspect of the present invention, a power steering apparatus detects an abnormality in the apparatus based on whether there is a periodic change within a predetermined frequency range with respect to the number of rotations of an electric motor, a steering speed, or a steering torque.

BRIEF DESCRIPTION OF DRAWINGS

FIG. 13 is a flowchart illustrating the flow of the processing for controlling the detection of the rust abnormality according to the fourth embodiment.

DESCRIPTION OF EMBODIMENTS

First Embodiment

In the following description, embodiments for implementing the present invention will be described with use of examples thereof based on the drawings.

[Configuration of Power Steering Apparatus]

Figure 1:
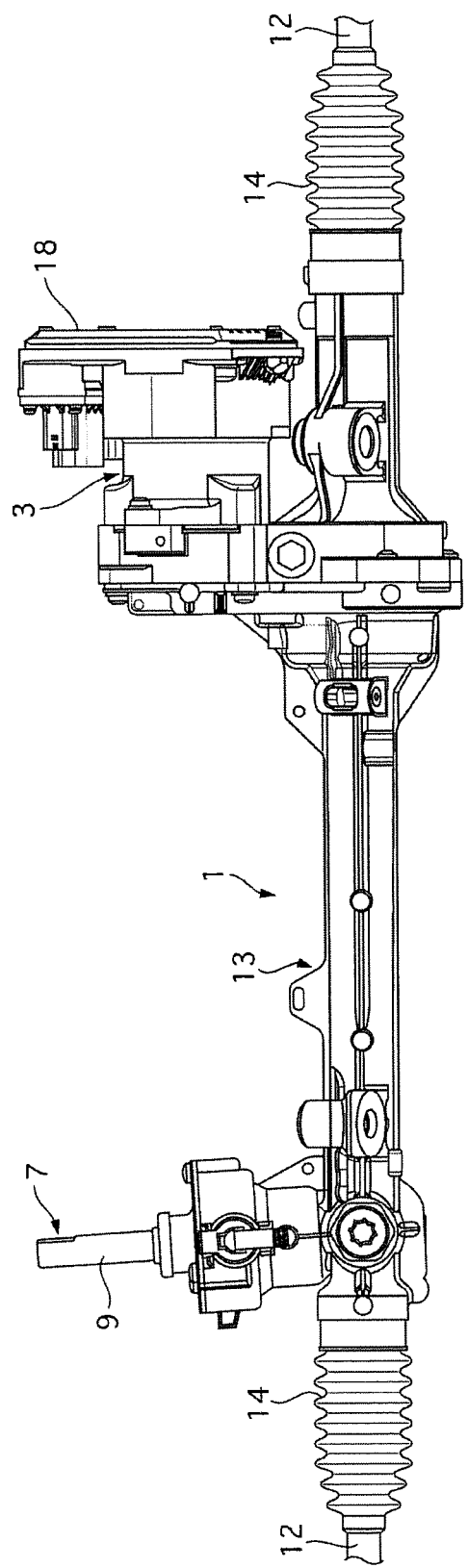
FIG. 1 is a front view of a power steering apparatus 1 according to a first embodiment.
Figure 2:
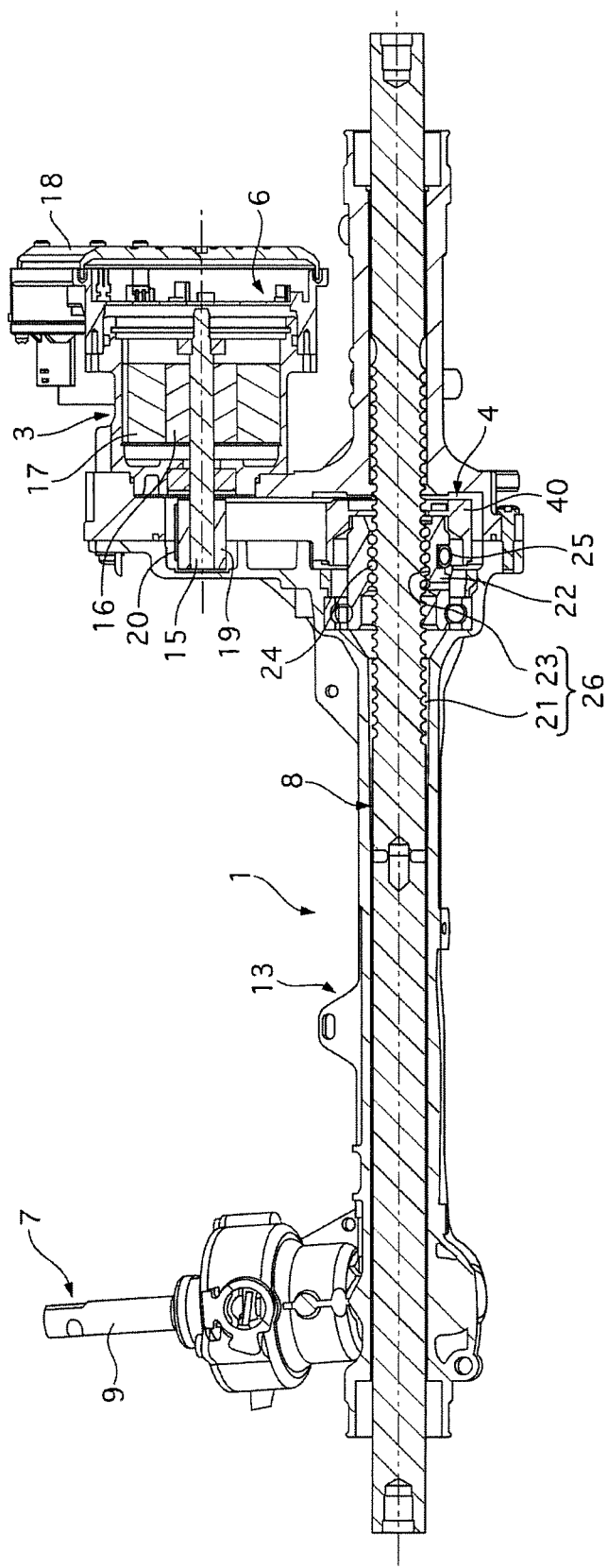
FIG. 2 is a partial cross-sectional view of FIG. 1.
Figure 3:
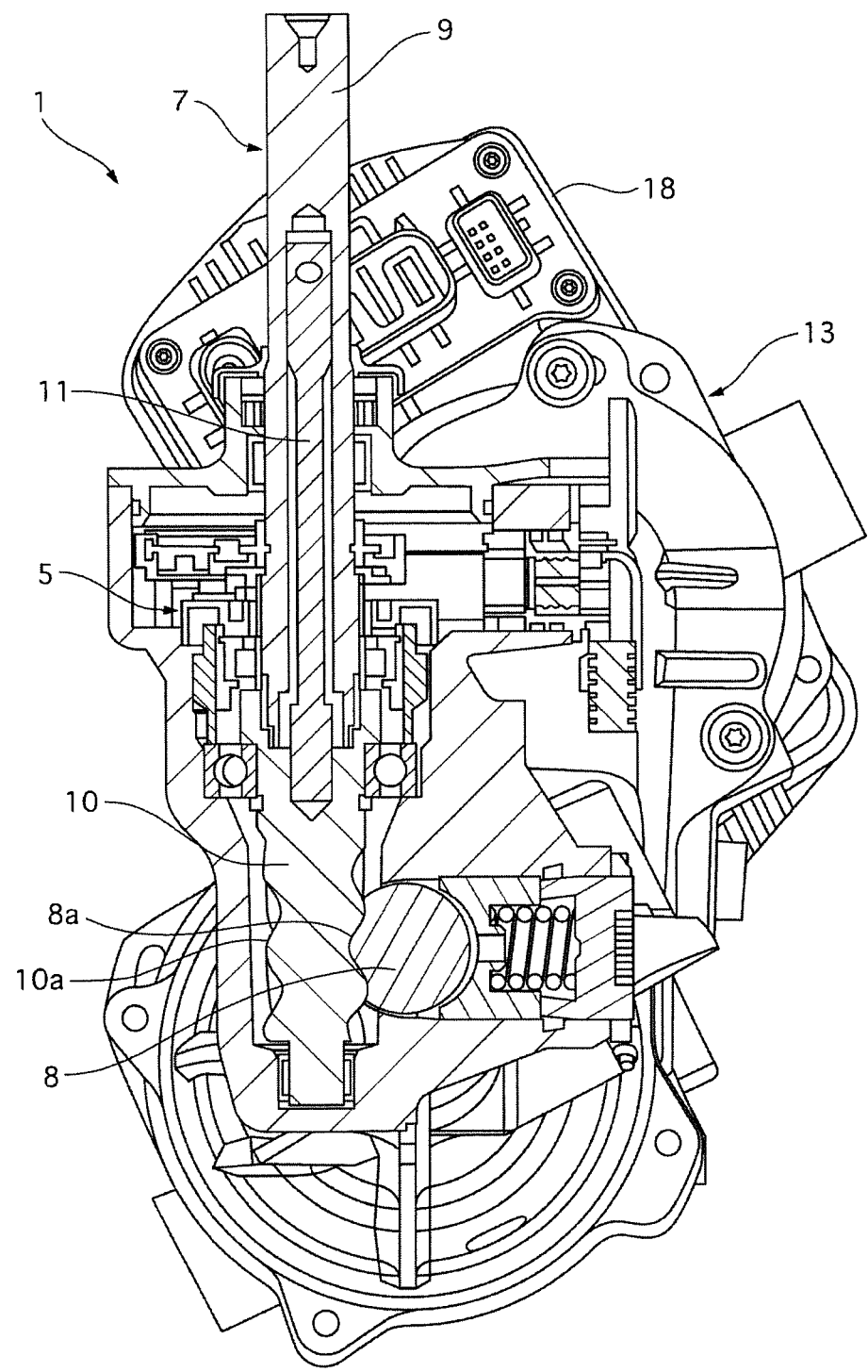
FIG. 3 is a cross-sectional view of a steering mechanism 2.

FIG. 1 is a front view of a power steering apparatus 1 according to a first embodiment. FIG. 2 is a partial cross-sectional view of FIG. 1. FIG. 3 is a cross-sectional view of a steering mechanism 2.

The power steering apparatus 1 according to the first embodiment includes the steering mechanism 2, an electric motor 3, a ball screw mechanism 4, a torque sensor 5, and a control unit 6.

The steering mechanism 2 includes a steering shaft 7 and a rack bar 8. The steering shaft 7 includes a steering shaft rod 9, a pinion shaft 10, and a torsion bar 11. The steering shaft rod 9 rotates integrally with a steering wheel. The pinion shaft 10 is connected to the steering shaft rod 9 via the torsion bar 11. Pinion teeth 10a are formed on an outer periphery of the pinion shaft 10. The pinion teeth 10a are meshed with rack teeth 8a formed on an outer periphery of the rack bar 8. The rack bar 8 is axially displaced in a width direction of a vehicle body according to a rotation of the steering shaft 7. The rack bar 8 is formed with use of a ferrous metallic material, such as a steel material. Ends of a pair of tie rods 12 and 12 are connected to both ends of the rack bar 8, respectively. A part of the steering shaft rod 9, the pinion shaft 10, and the rack bar 8 are contained in a gear housing 13. The gear housing 13 is formed with use of an aluminum alloy. A torque sensor 5 is contained in the gear housing 13. The torque sensor 5 detects a steering torque (a torsion bar torque) generated at the steering mechanism 2 based on a torsional amount of the torsion bar 11. Inner ends of dust boots 14 in the vehicle width direction are fixed to both ends of the gear housing 13 in the vehicle width direction, respectively. The dust boots 14 are each formed into a bellows-like annular shape with use of rubber or the like. Outer ends of the dust boots 14 in the vehicle width direction are fixed to inner ends of the tie rods 12 in the vehicle width direction, respectively.

The electric motor 3 is a three-phase brushless motor. The electric motor 3 functions to provide a steering force to the steering mechanism 2, and includes a motor shaft 15, a rotor 16, and a stator 17. These components are contained in a motor housing 18. The motor housing 18 is fixed to the gear housing 13. The motor shaft 15 is provided integrally with the rotor 16. An input pulley 19 is attached to the motor shaft 15. A belt 20 is hung on the input pulley 19. The rotor 16 is rotatably supported in the motor housing 18. The stator 17 is fixed to the motor housing 18. The control unit 6 is contained in the motor housing 18. The control unit 6 is a control substrate, and calculates a motor torque instruction (an instruction current value) for controlling driving of the electric motor 3 to perform assist control of controlling the electric motor 3 based on, for example, the torsion bar torque detected by the torque sensor 5.

The ball screw mechanism 4 is provided between the steering mechanism 2 and the electric motor 3. The ball screw mechanism 4 is a speed reducer that transmits a rotational force of the electric motor 3 to the steering mechanism 2. The ball screw mechanism 4 includes a wheel turning shaft-side ball screw groove 21, a nut 22, a nut-side ball screw groove 23, balls 24, and a tube (a circulation member) 25. The wheel turning shaft-side ball screw groove 21 is a helical groove formed on the outer peripheral side of the rack bar 8. The nut 22 is provided so as to surround the rack bar 8. The nut 22 is annularly formed with use of a steel material. The nut 22 is supported so as to be able to rotate and unable to be axially displaced relative to the gear housing 13. An output pulley 40 is fixed to an outer periphery of the nut 22. The belt 20 is hung on the output pulley 40. The nut-side ball screw groove 23 is a helical groove formed on an inner periphery of the nut 22. The nut-side ball screw groove 23 forms a ball circulation groove 26 together with the wheel turning shaft-side ball screw groove 21. A plurality of balls 24 is loaded in the ball circulation groove 26. The balls 24 are formed with use of a steel material. The tube 25 is provided on the outer peripheral side of the nut 22, and the balls 24 after reaching one end side or the other end side of the ball circulation groove 26 are returned to the other end side or the one end side of the ball circulation groove 26 via the tube 25.

The power steering apparatus 1 according to the first embodiment transmits the rotational force of the electric motor 3 to the ball screw mechanism 4 via the input pulley 19, the belt 20, and the output pulley 40, and provides an axial driving force to the rack bar 8, thereby assisting steering by a driver.

Figure 4:
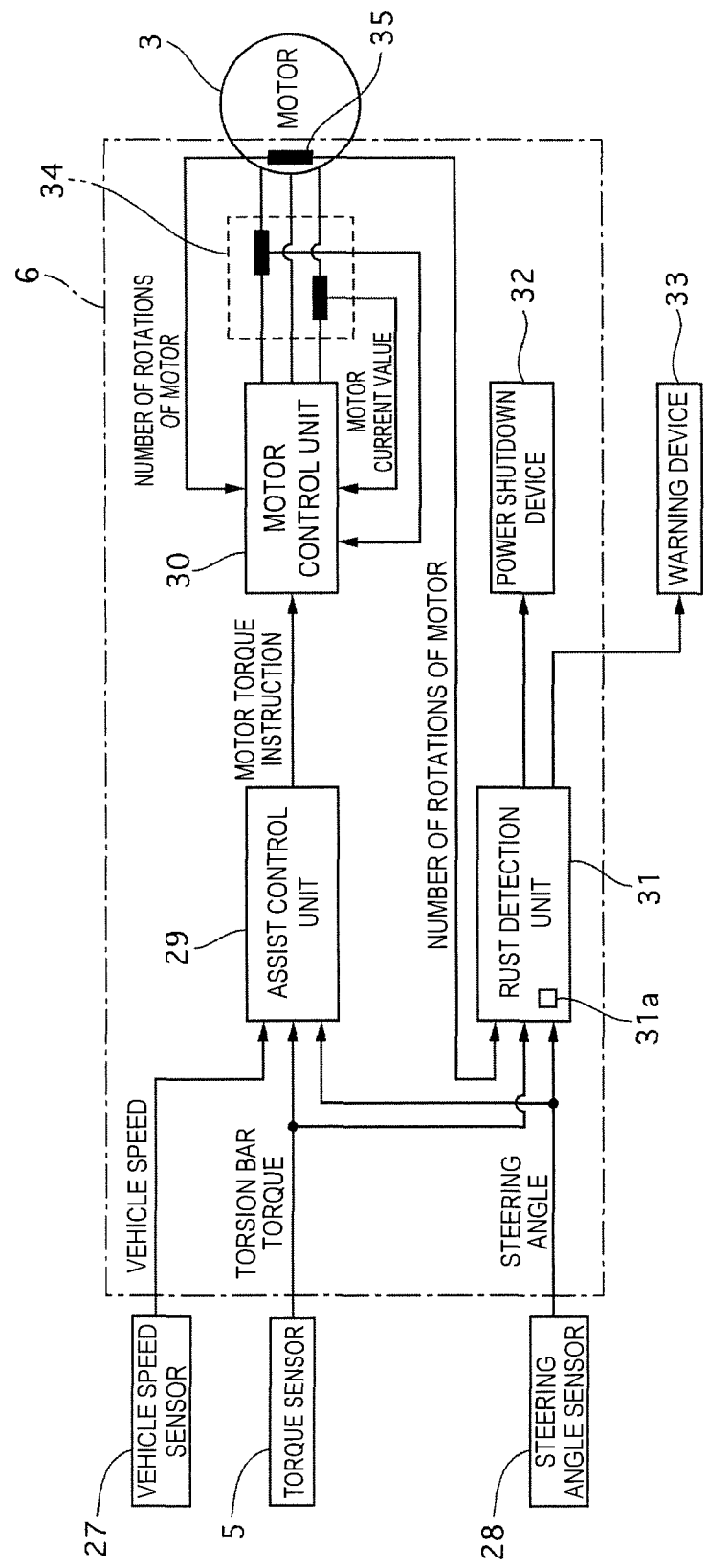
FIG. 4 is a control block diagram of a control unit 6 according to the first embodiment.

FIG. 4 is a control block diagram of the control unit 6 according to the first embodiment.

The control unit 6 includes an assist control unit (a motor control circuit) 29, a motor control unit 30, a rust detection unit (an abnormality detection circuit) 31, and a power shutdown device 32. A vehicle speed from a vehicle speed sensor 27, the torsion bar torque from the torque sensor 5, and a steering angle from a steering angle sensor 28 are input to the assist control unit 29. The assist control unit 29 calculates a motor torque instruction based on the vehicle speed, the torsion bar torque, and the steering angle, and outputs the calculated motor torque instruction to the motor control unit 30. The motor control unit 30 calculates a current instruction value directed to each phase of the electric motor 3 based on the motor torque instruction. The motor control unit 30 controls the current of the electric motor 3 in such a manner that a motor current value flowing in each phase of the electric motor 3 matches the current instruction. The motor current value is detected by a current sensor 34.

The rust detection unit 31 detects an abnormality due to generation of rust on the ball screw mechanism 4 (hereinafter also referred to as a rust abnormality), in particular, a loss or a reduction in smoothness of the steering that may be caused in connection with a periodic change in an operation load on the ball screw mechanism 4, based on the number of rotations of the motor, the torsion bar torque, and the steering angle (a steering angular velocity acquired from the steering angle). The periodic change in the operation load on the ball screw mechanism 4 may also occur when the ball screw mechanism 4 is broken or a foreign object enters the gear housing 13, similarly to when the rust is generated. Therefore, the rust detection unit 31 can also detect these abnormalities. The number of rotations of the motor is detected by a rotation number sensor 35. The rust detection unit 31 includes a low-pass filter 31*a*, which performs low-pass filter processing on a signal indicating the number of rotations of the motor and a signal indicating the torsion bar torque. The rust detection unit 31 outputs a warning request to a warning device (an on-board device) 33 if the abnormality is detected. The warning device 33 notifies the driver of the abnormality by, for example, lighting up a warning lamp. The warning device 33 may issue a warning sound. Further, the rust detection unit 31 outputs a power shutdown request to the power shutdown device 32 and stops the assist control when an ignition switch is turned on next time, if the abnormality is detected. The power shutdown device 32 shuts down the power supplied to the electric motor 3, if receiving the power shutdown request.

[Processing for Controlling Detection of Rust Abnormality]

Figure 5:
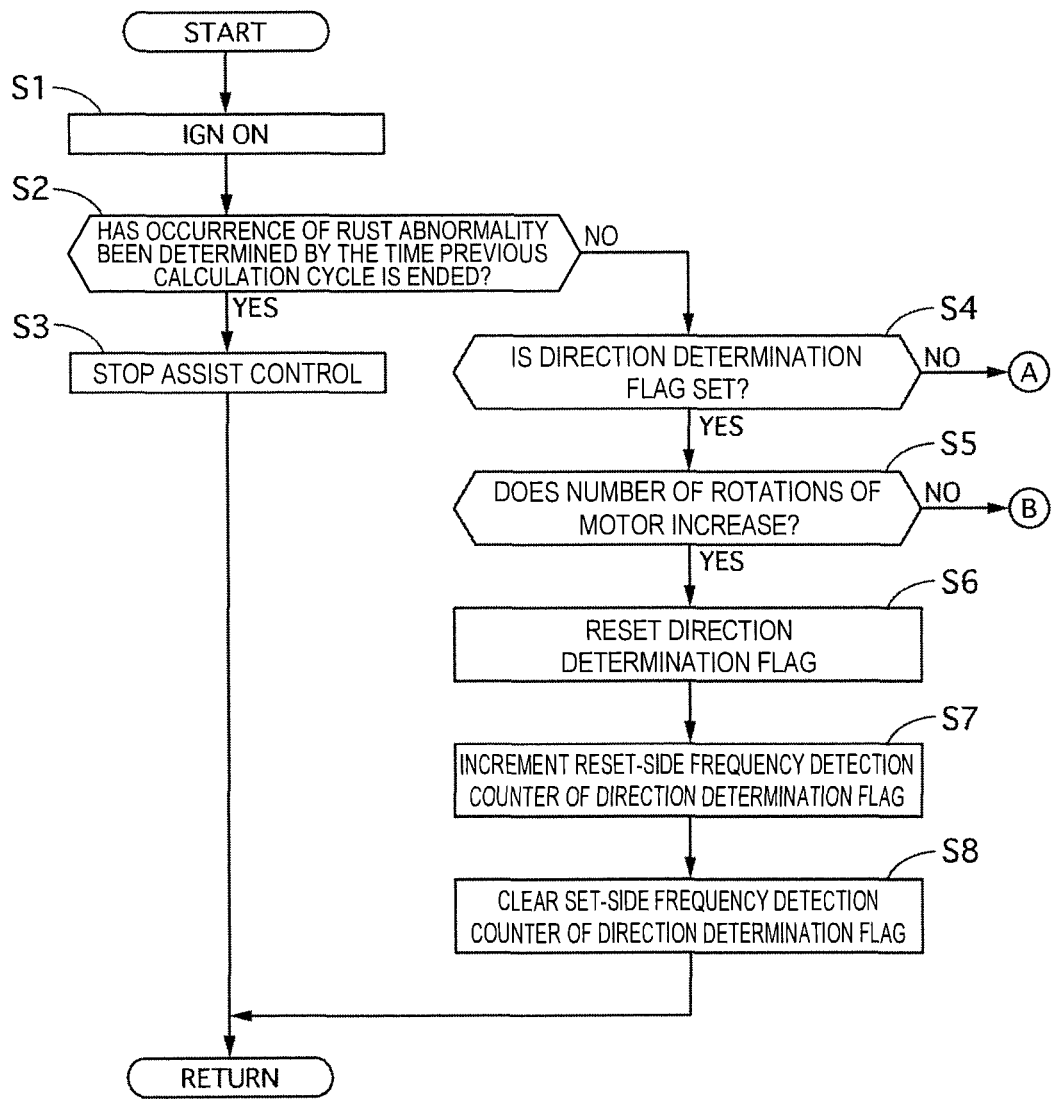
FIG. 5 is a flowchart illustrating a flow of processing for controlling detection of a rust abnormality according to the first embodiment, a second embodiment, and a third embodiment.
Figure 6:
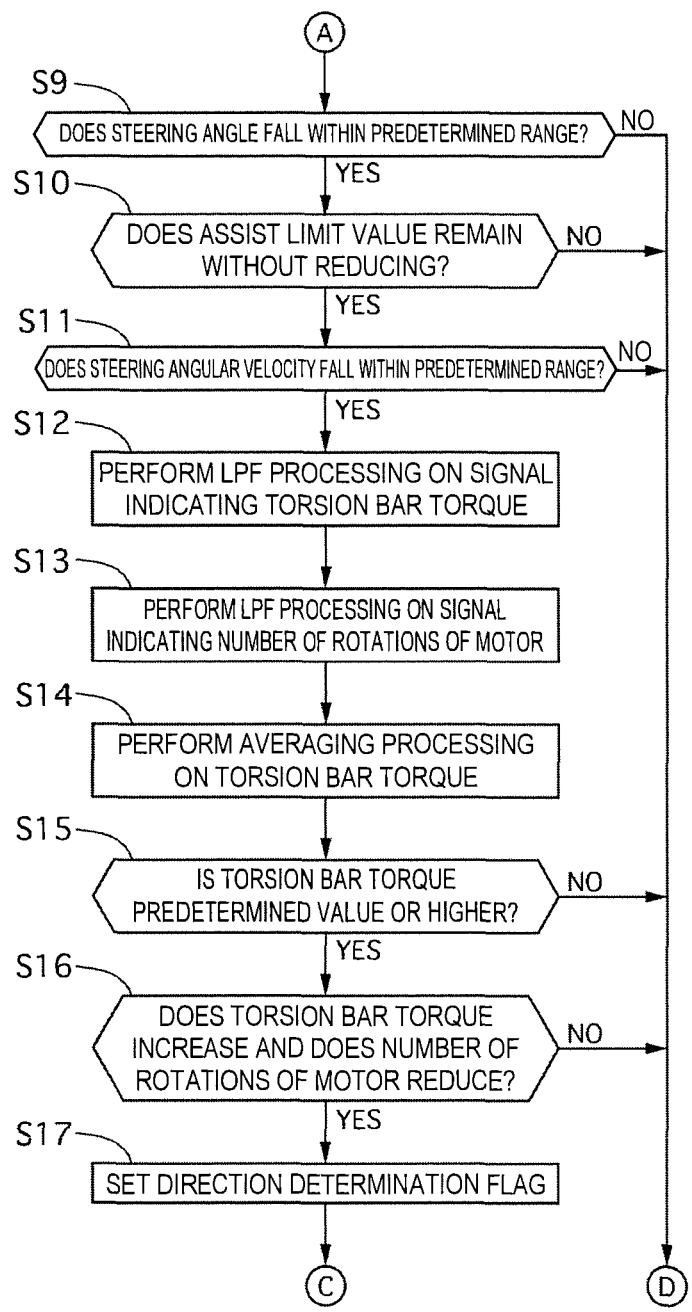
FIG. 6 is a flowchart illustrating the flow of the processing for controlling the detection of the rust abnormality according to the first and third embodiments.
Figure 7:
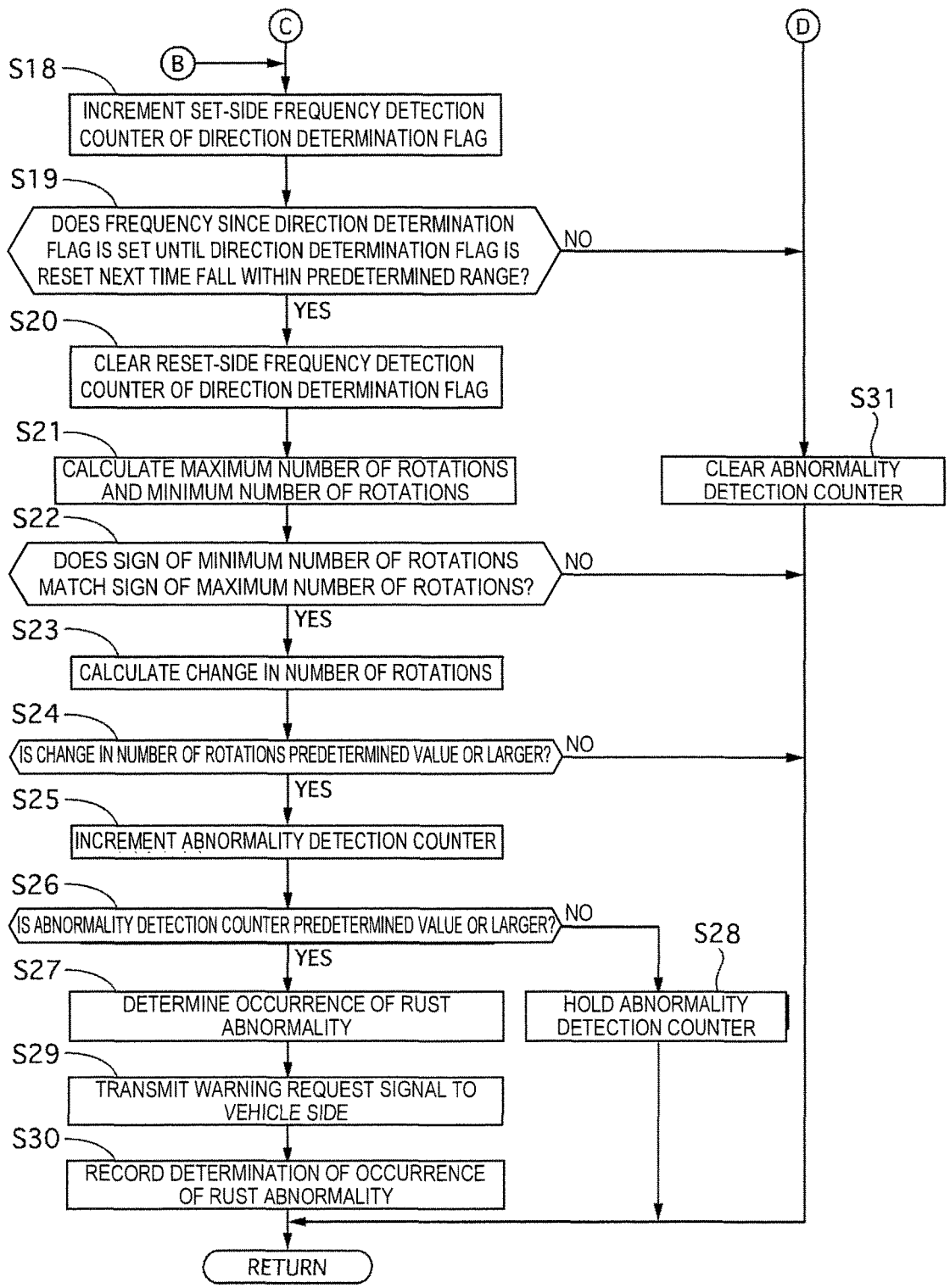
FIG. 7 is a flowchart illustrating the flow of the processing for controlling the detection of the rust abnormality according to the first and second embodiments.

FIGS. 5, 6, and 7 are flowcharts illustrating a flow of processing for controlling the detection of the rust abnormality that is performed by the rust detection unit 31 according to the first embodiment.

In step S1, the ignition switch is turned on by the driver.

In step S2, the rust detection unit 31 determines whether the occurrence of the rust abnormality has been determined by the time a previous calculation cycle is ended (by the time the ignition switch is turned on in step S1). If the rust detection unit 31 determines YES, the processing proceeds to step S3. If the rust detection unit 31 determines NO, the processing proceeds to step S4. The rust detection unit 31 determines whether the occurrence of the rust abnormality has been determined by reading in a rust abnormality occurrence determination flag from EEPROM data and determining that the occurrence of the rust abnormality has been determined if the rust abnormality occurrence determination flag is set.

In step S3, the rust detection unit 31 outputs the power shutdown request to the power shutdown device 32, and stops the assist control (manual steering).

In step S4, the rust detection unit 31 determines whether a direction determination flag is set. If the rust detection unit 31 determines YES, the processing proceeds to step S5. If the rust detection unit 31 determines NO, the processing proceeds to step S9.

In step S5, the rust detection unit 31 determines whether the number of rotations of the motor increases. If the rust detection unit 31 determines YES, the processing proceeds to step S6. If the rust detection unit 31 determines NO, the processing proceeds to step S18. The rust detection unit 31 determines whether the number of rotations of the motor increases by comparing the number of rotations of the motor in the previous calculation cycle and the number of rotations of the motor in a present calculation cycle.

In step S6, the rust detection unit 31 resets the direction determination flag.

In step S7, the rust detection unit 31 increments a reset-side frequency detection counter of the direction determination flag.

In step S8, the rust detection unit 31 clears a set-side frequency detection counter of the direction determination flag.

In step S9, the rust detection unit 31 determines whether the steering angle falls within a predetermined range. If the rust detection unit 31 determines YES, the processing proceeds to step S10. If the rust detection unit 31 determines NO, the processing proceeds to step S31. The predetermined range is a range of the steering angle where the rack bar 8 does not reach around a stroke end, and is set to be, for example, −450 to 450 [deg]

In step S10, the rust detection unit 31 determines whether an assist limit value remains without reducing. If the rust detection unit 31 determines YES, the processing proceeds to step S11. If the rust detection unit 31 determines NO, the processing proceeds to step S31. The assist control unit 29 limits the motor torque instruction according to the assist limit value to protect the motor when a voltage or a temperature of the electric motor 3 increases. If the assist limit value is kept at a normal value (for example, 6.3 [N]), the rust detection unit 31 determines that the assist limit value remains without reducing.

In step S11, the rust detection unit 31 determines whether the steering angular velocity (a steering velocity) falls within a predetermined range. If the rust detection unit 31 determines YES, the processing proceeds to step S12. If the rust detection unit 31 determines NO, the processing proceeds to step S31. The steering angular velocity is acquired by differentiating the steering angle detected by the steering angle sensor 28. The predetermined range is a steering angular velocity where the smoothness of the steering can be lost or can reduce in connection with the generation of the rust, and is set to be, for example, 5 to 45 [deg/sec]. Regarding this setting, a lower limit (a fourth predetermined value) of the predetermined range is set to 5 [deg/sec] to exclude a non-steering state (a state where the vehicle is little steered), in which no periodic change occurs in the operation load on the ball screw mechanism 4 due to the generation of the rust. Further, an upper limit (a fifth predetermined value) of the predetermined range is set to 45 [deg/sec] to exclude a forcible steering state (a state where the vehicle is forcibly steered by the driver), in which no periodic change occurs in the operation load on the ball screw mechanism 4 due to the generation of the rust.

In step S12, the rust detection unit 31 performs the low-pass filter processing on the signal indicating the torsion bar torque (the signal of the torque sensor 5) by the low-pass filter 31a. A cutoff frequency of the low-pass filter 31a is a frequency capable of removing noise, and is set to be, for example, 6 [Hz].

In step S13, the rust detection unit 31 performs the low-pass filter processing on the signal indicating the number of rotations of the motor by the low-pass filter 31a.

In step S14, the rust detection unit 31 performs averaging processing on the torsion bar torque. The averaging processing is processing for acquiring an average value of the torsion bar torque in a predetermined calculation cycle.

In step S15, the rust detection unit 31 determines whether the average value of the torsion bar torque is a predetermined value or higher. If the rust detection unit 31 determines YES, the processing proceeds to step S16. If the rust detection unit 31 determines NO, the processing proceeds to step S31. The predetermined value is set to be, for example, 5 [Nm]. Regarding this setting, the average value of the torsion bar torque is approximately 4 [Nm] if the steering angular velocity falls within the range of 5 to 45 [deg/sec] at normal times when no abnormality, such as the rust, occurs in the ball screw mechanism 4. Therefore, the rust detection unit 31 can determine that the abnormality has occurred in the ball screw mechanism 4 if the average value of the torsion bar torque is 5 [Nm] or higher.

In step S16, the rust detection unit 31 determines whether the torsion bar torque increases and the number of rotations of the motor reduces. If the rust detection unit 31 determines YES, the processing proceeds to step S17. If the rust detection unit 31 determines NO, the processing proceeds to step S31. The rust detection unit 31 determines whether the torsion bar torque increases by comparing the torsion bar torque in the previous calculation cycle and the torsion bar torque in the present calculation cycle. The same applies to the determination about whether the number of rotations of the motor reduces.

In step S17, the rust detection unit 31 sets the direction determination flag.

In step S18, the rust detection unit 31 increments the set-side frequency detection counter of the direction determination flag.

In step S19, the rust detection unit 31 determines whether a frequency of a change in the number of rotations of the motor falls within a predetermined range. If the rust detection unit 31 determines YES, the processing proceeds to step S20. If the rust detection unit 31 determines NO, the processing proceeds to step S31. The predetermined range is a range defined by adding margins to upper and lower limits of a frequency range of 2 to 3 [Hz] regarding the periodic change in the operation load on the ball screw mechanism 4 due to the generation of the rust, and is set to be, for example, 1 to 5 [Hz]. Regarding this setting, an upper limit of the frequency is set to 5 [Hz] to prevent or reduce confusion with a resonance of the torsion bar 11 (a resonant frequency is higher than 5 [Hz]). Further, a lower limit of the frequency is set to 1 [Hz] or higher to exclude a state where the vehicle is running straight, in which no periodic change occurs in the operation load on the ball screw mechanism 4 due to the generation of the rust. The frequency of the change in the number of rotations of the motor is set to be a reciprocal of a value (a cycle) acquired by multiplying, by a calculation cycle, a sum of a count value of the reset-side frequency detection counter and a counter value of the set-side frequency detection counter since the direction determination flag is set until the direction determination flag is reset next time.

In step S20, the rust detection unit 31 clears the frequency detection counter corresponding to an increase in the number of rotations (the reset-side frequency detection counter of the direction determination flag).

In step S21, the rust detection unit 31 calculates a maximum number of rotations and a minimum number of rotations with respect to the number of rotations of the motor in one cycle of the change in the number of rotations of the motor.

In step S22, the rust detection unit 31 determines whether a sign of the minimum number of rotations and a sign of the maximum number of rotations match each other. If the rust detection unit 31 determines YES, the processing proceeds to step S23. If the rust detection unit 31 determines NO, the processing proceeds to RETURN. When the smoothness of the steering is lost or reduces in connection with the rust abnormality, the sign of the number of rotations of the motor does not change. Therefore, an inversion of the sign of the number of rotations of the motor means that it is highly likely that the number of rotations of the motor changes due to another cause, whereby the rust detection unit 31 cancels the detection of the abnormality in this case, thereby preventing or reducing false detection.

In step S23, the rust detection unit 31 calculates the change in the number of rotations, which is a difference between the maximum number of rotations and the minimum number of rotations.

In step S24, the rust detection unit 31 determines whether the change in the number of rotations is a predetermined value or larger. If the rust detection unit 31 determines YES, the processing proceeds to step S25. If the rust detection unit 31 determines NO, the processing proceeds to RETURN. The predetermined value is a change in the number of rotations that allows the rust detection unit 31 to predict that the smoothness of the steering is lost or reduces in connection with the rust abnormality, and is set to be, for example, 100 [rmp].

In step S25, the rust detection unit 31 increments an abnormality detection counter.

In step S26, the rust detection unit 31 determines whether the abnormality detection counter is a predetermined value or larger. If the rust detection unit 31 determines YES, the processing proceeds to step S27. If the rust detection unit 31 determines NO, the processing proceeds to step S28. The predetermined value is set to be, for example, 10.

In step S27, the rust detection unit 31 determines the occurrence of the rust abnormality.

In step S28, the rust detection unit 31 holds the abnormality detection counter.

In step S29, the rust detection unit 31 outputs the warning request signal to the warning device 33 on the vehicle side.

In step S30, the rust detection unit 31 sets the rust abnormality occurrence determination flag in the EEPROM data, thereby recording that the occurrence of the rust abnormality has been determined.

In step S31, the rust detection unit 31 clears the abnormality detection counter.

[Regarding Method for Detecting Rust Abnormality According to First Embodiment]

Power steering apparatuses are subject to the generation of the rust on the speed reducer (the ball screw mechanism) formed with use of the steel material, if water or dust enters the housing containing therein the rack bar due to, for example, a breakage of the dust boot. The advancement of the rust may lead to a steering lock, and therefore necessitates the detection of the generation of the rust, and the stop of the power steering function and the issue of the warning to the driver. As a measure therefor, the conventional power steering apparatuses detect the entry of water into the housing by including the raindrop sensor in the housing. However, the employment of this configuration forces the addition of the raindrop sensor, thereby raising a demerit such as a cost increase.

If the rust is generated on the ball screw mechanism, the smoothness of the steering is lost or reduces due to the periodic change in the operation load on the ball screw mechanism when the vehicle is steered. Therefore, the power steering apparatus 1 according to the first embodiment detects the rust abnormality by detecting the periodic change in the operation load on the ball screw mechanism 4. The periodic change in the operation load on the ball screw mechanism 4 due to the generation of the rust appears as the periodic changes in the number of rotations of the motor, the steering angular velocity, and the torsion bar torque. More specifically, when the smoothness of the steering is lost or reduces due to the generation of the rust, reduction and increase of the torsion bar torque and increase and reduction of the number of rotations of the motor and the steering angular velocity occur synchronously. All of the number of rotations of the motor, the steering angular velocity, and the torsion bar torque can be detected or calculated by sensors already provided to the power steering apparatuses. In the first embodiment, the rust abnormality is detected based on the periodic changes in the number of rotations of the motor and the torsion bar torque, which allows the rust abnormality to be detected without requiring the addition of the sensor for detecting the abnormality. Further, the detection of the rust abnormality is refrained from in the states where the steering angular velocity is high, the vehicle is little steered, the vehicle is forcibly steered by the driver, the rack bar 8 is located around the stroke end, or the assist limitation is exerted, which contributes to preventing or reducing the confusion with the periodic change in, for example, the number of rotations of the motor due to another cause (the resonance of the torsion bar or the like), thereby succeeding in improving accuracy of the detection of the abnormality.

Figure 8:
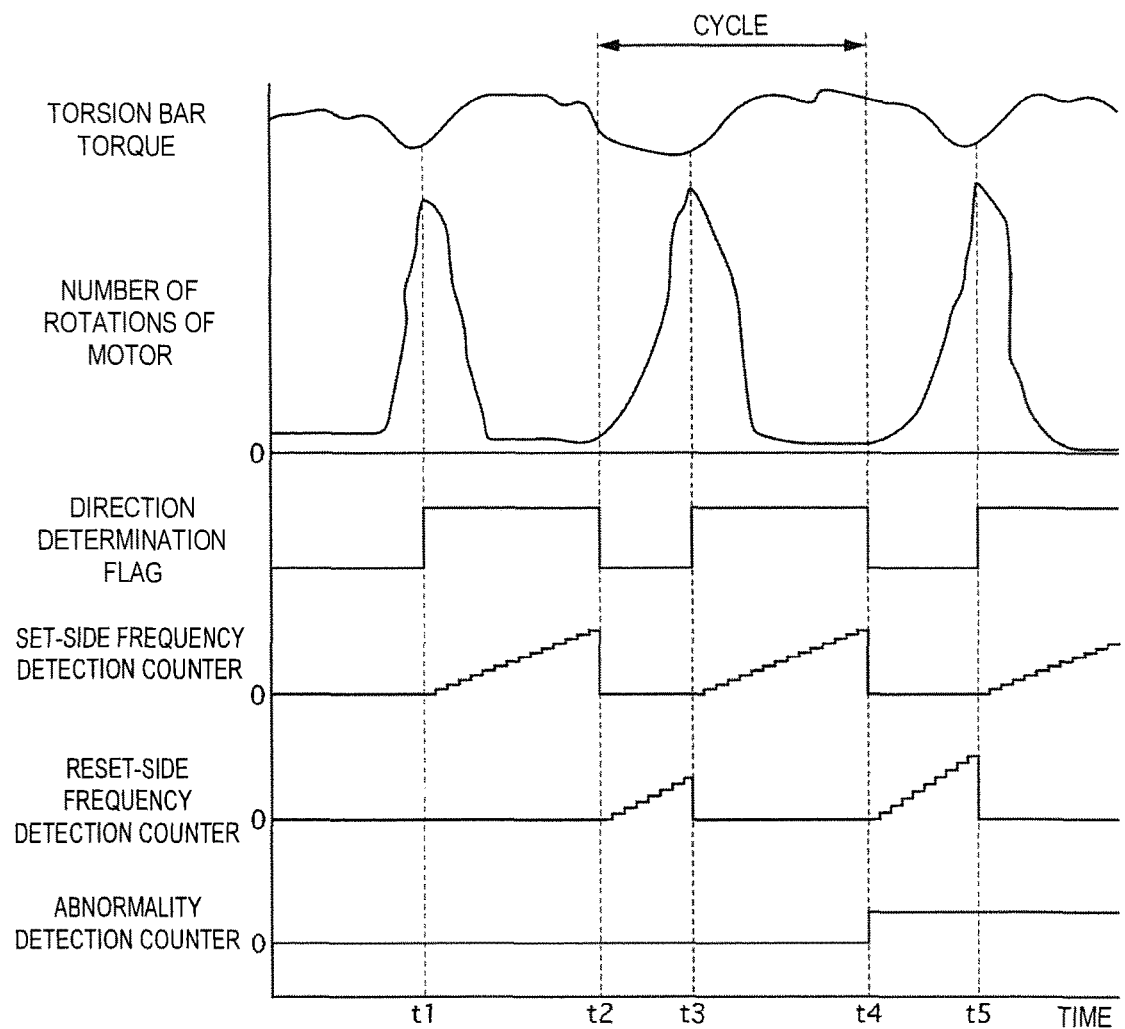
FIG. 8 is a timing chart illustrating an operation when the rust abnormality has occurred, at the time of the processing for controlling the detection of the rust abnormality according to the first embodiment.

FIG. 8 is a timing chart illustrating an operation when the rust abnormality has occurred, at the time of the processing for controlling the detection of the rust abnormality according to the first embodiment.

At time t1, the torsion bar torque is increasing and the number of rotations of the motor starts reducing, so that the rust detection unit 31 sets the direction determination flag. During a time period from times t1 to t2, the rust detection unit 31 increments the set-side frequency counter of the direction determination flag.

At time t2, the number of rotations of the motor starts increasing, so that the rust detection unit 31 resets the direction determination flag and clears the set-side frequency counter of the direction determination flag. During a time period from times t2 to 3, the rust detection unit 31 increments the reset-side frequency counter of the direction determination flag.

At time t3, the torsion bar torque is increasing and the number of rotations of the motor starts reducing, so that the rust detection unit 31 sets the direction determination flag. During a time period from times t3 to t4, the rust detection unit 31 increments the set-side frequency counter of the direction determination flag.

At time t4, the number of rotations of the motor starts increasing, so that the rust detection unit 31 resets the direction determination flag and clears the set-side frequency counter of the direction determination flag. At this time, the frequency acquired from the sum of the count value of the reset-side frequency counter and the count value of the set-side frequency counter when the direction determination flag is reset falls within the predetermined range (1 to 5 [Hz]), and the change in the number of rotations is the predetermined value (100 [rpm]) or larger, so that the rust detection unit 31 increments the abnormality detection counter.

At time t5, the torsion bar torque is increasing and the number of rotations of the motor starts reducing, so that the rust detection unit 31 sets the direction determination flag.

After time t5, the rust detection unit 31 repeats the processing performed during times t3 to t4. Then, once the abnormality detection counter reaches the predetermined value (10), the rust detection unit 31 determines the occurrence of the rust abnormality and sets the rust abnormality occurrence determination flag in the EEPROM data, and the warning indicating the rust abnormality is issued from the warning device 33 to the driver.

The first embodiment can bring about advantageous effects that will be listed below.

(1-1) The power steering apparatus includes the steering mechanism 2 including the steering shaft 7 configured to rotate along with the rotation of the steering wheel and the rack bar 8 configured to be axially displaced according to the rotation of the steering shaft 7 and made from the ferrous metallic material, the electric motor 3 configured to provide the steering force to the steering mechanism 2, and the speed reducer provided between the steering mechanism 2 and the electric motor 3 and configured to transmit the rotational force of the electric motor 3 to the steering mechanism 2. The speed reducer includes the ball screw mechanism 4. The ball screw mechanism 4 includes the wheel turning shaft-side ball screw groove 21 provided on the outer peripheral side of the rack bar 8 and having the helical groove shape, the nut 22 formed annularly so as to surround the rack bar 8 and made from the ferrous metallic material while being provided rotatably relative to the rack bar 8, and the nut-side ball screw groove 23 provided on the inner peripheral side of the nut 22 and having the helical groove shape. The nut-side ball screw groove 23 forms the ball circulation groove 26 together with the wheel turning shaft-side ball screw groove 21. The ball screw mechanism 4 further includes the plurality of balls 24 made from the ferrous metallic material and loaded in the ball circulation groove 26, and the tube 25 provided on the outer side of the nut 22 in the radial direction with respect to the rotational axis of the nut 22 and connecting one end side and the other end side of the ball circulation groove 26 so as to allow the plurality of balls 24 to be circulated from the one end side to the other end side of the ball circulation groove 26. The power steering apparatus further includes the torque sensor 5 configured to detect the torsion bar torque generated at the steering mechanism 2, the control unit 6 configured to calculate, based on the torsion bar torque, the motor torque instruction value for controlling the driving of the electric motor 3 and output the calculated motor torque instruction value to the electric motor 3, and the rust detection unit 31 provided in the control unit and configured to detect the abnormality (the rust abnormality) in the apparatus based on whether there is the periodic change in the number of rotations of the motor within the predetermined frequency range (1 to 5 [Hz]).

Therefore, the abnormality in the apparatus can be highly accurately detected without use of the sensor for detecting the abnormality.

(2-2) In the power steering apparatus described in the above item (1-1), the steering mechanism 2 includes the torsion bar 11 provided at the steering shaft 7. The torque sensor 5 detects the torsion bar torque based on the torsional amount of the torsion bar 11. The predetermined frequency in the rust detection unit 31 is set to the frequency lower than the resonant frequency (higher than 5 [Hz]) of the torsion bar 11.

Therefore, the confusion with the resonance of the torsion bar 11 can be prevented or reduced.

(3-3) In the power steering apparatus described in the above item (2-2), the predetermined frequency in the rust detection unit 31 is set to 5 [Hz] or lower.

The confusion with the resonance of the torsion bar can be prevented or reduced by setting the predetermined frequency in the rust detection unit 31 to 5 hertz or lower, if taking into consideration the resonant frequency (higher than 5 [Hz]) of the torsion bar 11 used in the power steering apparatus.

(4-4) In the power steering apparatus described in the above item (2-2), the predetermined frequency in the rust detection unit 31 is set to 1 [Hz] or higher.

No periodic change occurs in the operation load on the ball screw mechanism 4 due to the generation of the rust in the state where the vehicle is running straight, in which the predetermined frequency is lower than 1 [Hz]. Therefore, the accuracy of the detection of the abnormality can be improved by refraining from detecting the rust abnormality in the state where the vehicle is running straight.

(5-5) In the power steering apparatus described in the above item (1-1), the rust detection circuit 31 detects the abnormality in the apparatus based on the torsion bar torque and the number of rotations of the motor.

When the periodic increase has occurred in the operation load on the ball screw mechanism 4 due to the generation of the rust, the number of rotations of the motor reduces while the torsion bar torque increases. The accuracy of the detection of the abnormality can be improved by further taking the combination of these reduction and increase into consideration.

(6-6) In the power steering apparatus described in the above item (1-1), the rust detection unit 31 detects the abnormality in the apparatus based on the cycle in which the number of rotations of the motor falls below a first predetermined value, the cycle in which the steering angular velocity falls below a second predetermined value, or the cycle in which the torsion bar torque exceeds a third predetermined value.

When the periodic increase has occurred in the operation load on the ball screw mechanism 4 due to the generation of the rust, the number of rotations of the motor and the steering angular velocity reduce to fall below the values (the first predetermined value and the second predetermined value) that they are predicted to have, respectively, at normal times when no rust is generated, and increase after that. On the other hand, the torsion bar torque increases to exceed the value (the third predetermined value) that the torsion bar torque is predicted to have at normal times when no rust is generated, and reduces after that. The accuracy of the detection of the abnormality can be improved by further taking the combination of these reduction and increase into consideration.

(7-7) In the power steering apparatus described in the above item (1-1), the rust detection unit 31 detects the abnormality in the apparatus when the steering angular velocity is 5 [deg/sec] or higher and 45 [deg/sec] or lower.

No periodic change occurs in the operation load on the ball screw mechanism 4 due to the generation of the rust in the non-steering state where the steering angular velocity is lower than 5 [deg/sec] and the forcible steering state where the steering angular velocity exceeds 45 [deg/sec]. Therefore, the accuracy of the detection of the abnormality can be improved by refraining from detecting the rust abnormality in the non-steering state and the forcible steering state.

(8-9) The power steering apparatus described in the above item (1-1) further includes the low-pass filter 31a provided in the control unit 6. The rust detection unit 31 detects the abnormality in the power steering apparatus based on the signal indicating the number of rotations of the electric motor 3 and the signal indicating the torsion bar torque that are subjected to the filter processing by the low-pass filter 31a.

Therefore, high-frequency noise is removed by the low-pass filter 31a from the signal indicating the number of rotations of the motor and the signal indicating the torsion bar torque, so that the accuracy of the detection of the abnormality can be improved.

(9-10) In the power steering apparatus described in the above item (1-1), the rust detection unit 31 detects the abnormality in the apparatus when the average value of the torsion bar torque in the predetermined time period is higher than the predetermined value.

When the abnormality has occurred in the operation of the ball screw mechanism 4, the average value of the torsion bar torque also increases. Therefore, the accuracy of the detection of the abnormality can be improved by further taking this increase in the torsion bar torque into consideration.

(10-12) In the power steering apparatus described in the above item (1-1), the rust detection unit 31 does not use the information indicating the number of rotations of the motor, the steering angular velocity, and the torsion bar torque in the state where the rack bar 8 is displaced to around the stroke end (the steering angle is outside the predetermined range (−450 to 450 [deg])), for the detection of the abnormality in the apparatus.

The number of rotations of the motor and the steering angular velocity reduce to almost zero when the rack bar 8 is located around the stroke end, and the torsion bar torque becomes higher than usual in the abutting state. This can cause false detection, whereby the accuracy of the detection of the abnormality can be improved by refraining from using the information when the rack bar 8 is located around the stroke end, for the detection of the abnormality.

(11-13) In the power steering apparatus described in the above item (1-1), when detecting the abnormality in the apparatus, the rust detection unit 31 outputs the signal regarding the abnormality in the apparatus to the warning device 33 for notifying the driver of the abnormality.

Therefore, when the abnormality in the apparatus is detected, the driver is notified thereof with the warning light or the warning sound, which can enhance safety.

(12-14) In the power steering apparatus described in the above item (1-1), the rust detection unit 31 does not use the information indicating the number of rotations of the motor, the steering angular velocity, and the torsion bar torque in the state where the limitation is imposed on the motor torque instruction value according to the assist limit value due to a cause other than the abnormality in the apparatus that is detected by the rust detection unit 31, for the detection of the abnormality.

In the state where the limitation is imposed on the motor torque instruction value due to a different cause from the abnormality in the operation of the ball screw mechanism 4, the number of rotations of the motor, the steering angular velocity, and the torsion bar torque may be affected due to this limitation. They may become a cause for false detection, whereby the accuracy of the detection of the abnormality can be improved by refraining from using the information in this state for the detection of the abnormality.

(13-15) The control circuit for the power steering apparatus is provided. The power steering apparatus includes the steering mechanism 2 including the steering shaft 7 configured to rotate along with the rotation of the steering wheel and the rack bar 8 configured to be axially displaced according to the rotation of the steering shaft 7 and made from the ferrous metallic material, the electric motor 3 configured to provide the steering force to the steering mechanism 2, and the speed reducer provided between the steering mechanism 2 and the electric motor 3 and configured to transmit the rotational force of the electric motor 3 to the steering mechanism 2. The speed reducer includes the ball screw mechanism 4. The ball screw mechanism 4 includes the wheel turning shaft-side ball screw groove 21 provided on the outer peripheral side of the rack bar 8 and having the helical groove shape, the nut 22 formed annularly so as to surround the rack bar 8 and made from the ferrous metallic material while being provided rotatably relative to the rack bar 8, and the nut-side ball screw groove 23 provided on the inner peripheral side of the nut 22 and having the helical groove shape. The nut-side ball screw groove 23 forms the ball circulation groove 26 together with the wheel turning shaft-side ball screw groove 21. The ball screw mechanism 4 further includes the plurality of balls 24 made from the ferrous metallic material and loaded in the ball circulation groove 26, and the tube 25 provided on the outer side of the nut 22 in the radial direction with respect to the rotational axis of the nut 22 and connecting one end side and the other end side of the ball circulation groove 26 so as to allow the plurality of balls 24 to be circulated from the one end side to the other end side of the ball circulation groove 26. The power steering apparatus further includes the torque sensor 5 configured to detect the torsion bar torque generated at the steering mechanism 2. The control circuit includes the assist control unit 29 configured to calculate, based on the torsion bar torque, the motor torque instruction value for controlling the driving of the electric motor 3 and output the calculated motor torque instruction value to the electric motor 3, and the rust detection unit 31 configured to detect the abnormality in the apparatus based on whether there is the periodic change in the number of rotations of the motor within the predetermined frequency range.

Therefore, the abnormality in the apparatus can be highly accurately detected without use of the sensor for detecting the abnormality.

(14-16) In the control circuit for the power steering apparatus described in the above item (13-15), the steering mechanism 2 includes the torsion bar 11 provided at the steering shaft 7. The torque sensor 5 detects the torsion bar torque based on the torsional amount of the torsion bar 11. The predetermined frequency in the rust detection unit 31 is set to the frequency lower than the resonant frequency (higher than 5 [Hz]) of the torsion bar 11.

Therefore, the confusion with the resonance of the torsion bar 11 can be prevented or reduced.

(15-17) In the control circuit for the power steering apparatus described in the above item (13-15), the rust detection unit 31 detects the abnormality in the apparatus based on the torsion bar torque and the number of rotations of the motor.

When the periodic increase has occurred in the operation load on the ball screw mechanism 4 due to the generation of the rust, the number of rotations of the motor reduces while the torsion bar torque increases. The accuracy of the detection of the abnormality can be improved by further taking the combination of these reduction and increase into consideration.

(16-18) In the control circuit for the power steering apparatus described in the above item (13-15), the rust detection unit 31 detects the abnormality in the apparatus based on the cycle in which the number of rotations of the motor falls below the first predetermined value, the cycle in which the steering angular velocity falls below the second predetermined value, or the cycle in which the torsion bar torque exceeds the third predetermined value.

When the periodic increase has occurred in the operation load on the ball screw mechanism 4 due to the generation of the rust, the number of rotations of the motor and the steering velocity reduce to fall below the values (the first predetermined value and the second predetermined value) that they are predicted to have, respectively, at normal times when no rust is generated, and increase after that. On the other hand, the torsion bar torque increases to exceed the value (the third predetermined value) that the torsion bar torque is predicted to have at normal times when no rust is generated, and reduces after that. The accuracy of the detection of the abnormality can be improved by further taking the combination of these reduction and increase into consideration.

(17-19) In the control circuit for the power steering apparatus described in the above item (13-15), the rust detection unit 31 detects the abnormality in the apparatus when the steering angular velocity is 5 [deg/sec] or higher and 45 [deg/sec] or lower.

No periodic change occurs in the operation load on the ball screw mechanism 4 due to the generation of the rust in the non-steering state where the steering angular velocity is lower than 5 [deg/sec] and the forcible steering state where the steering angular velocity exceeds 45 [deg/sec]. Therefore, the accuracy of the detection of the abnormality can be improved by refraining from detecting the rust abnormality in the non-steering state and the forcible steering state.

Second Embodiment

A second embodiment is different from the first embodiment in terms of the processing for controlling the detection of the rust abnormality, in which the predetermined value to be compared with the average value of the torsion bar torque is changed according to air in a tier of each wheel. Similar configurations to the first embodiment will not be illustrated and described herein.

Figure 9:
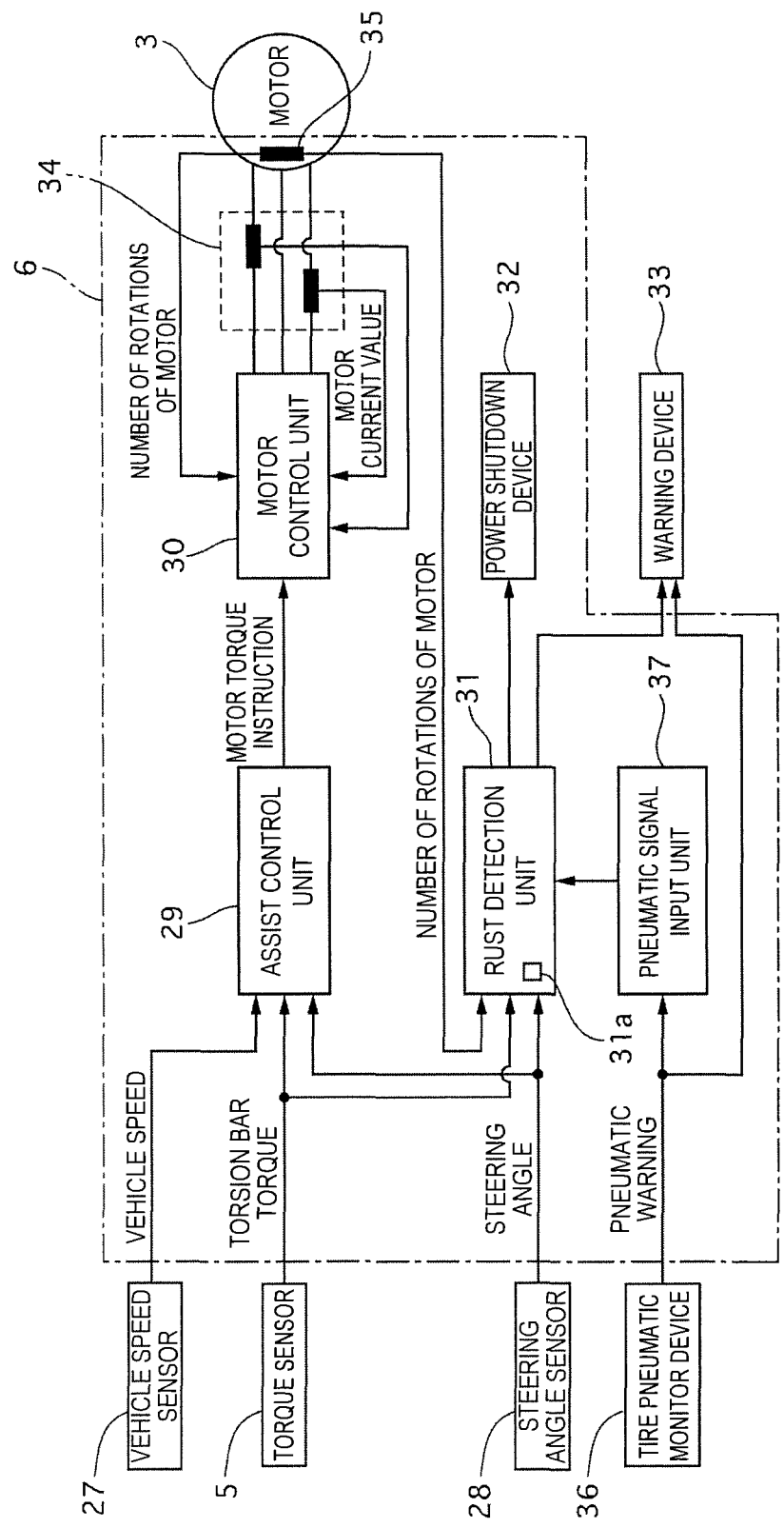
FIG. 9 is a control block diagram of the control unit 6 according to the second embodiment.

FIG. 9 is a control block diagram illustrating the control unit 6 according to the second embodiment.

The control block according to the second embodiment is different from the configuration according to the first embodiment illustrated in FIG. 4 in terms of addition of a tire pneumatic monitor device 36 and a pneumatic signal input unit 37 thereto.

The tire pneumatic monitor device 36 monitors a pneumatic pressure in the tire of each wheel, and displays the pneumatic pressure in each tire on a display. Further, the tire pneumatic monitor device 36 outputs a pneumatic warning signal to the warning device 33 if the pneumatic pressure in the tire deviates from a normal range. When the pneumatic warning signal is input, the warning device 33 notifies the driver of an abnormality in the pneumatic pressure in the tire by, for example, lighting up the warning lamp. The warning device 33 may issues a warning sound. The pneumatic warning signal is also input to the pneumatic signal input unit 37.

When the pneumatic warning signal is input to the pneumatic signal input unit 37, the rust detection unit 31 corrects the predetermined value to be compared with the average value of the torsion bar torque in the processing for controlling the detection of the rust abnormality, to a higher value than when the pneumatic warning signal is not input.

[Processing for Controlling Detection of Rust Abnormality]

Figure 10:
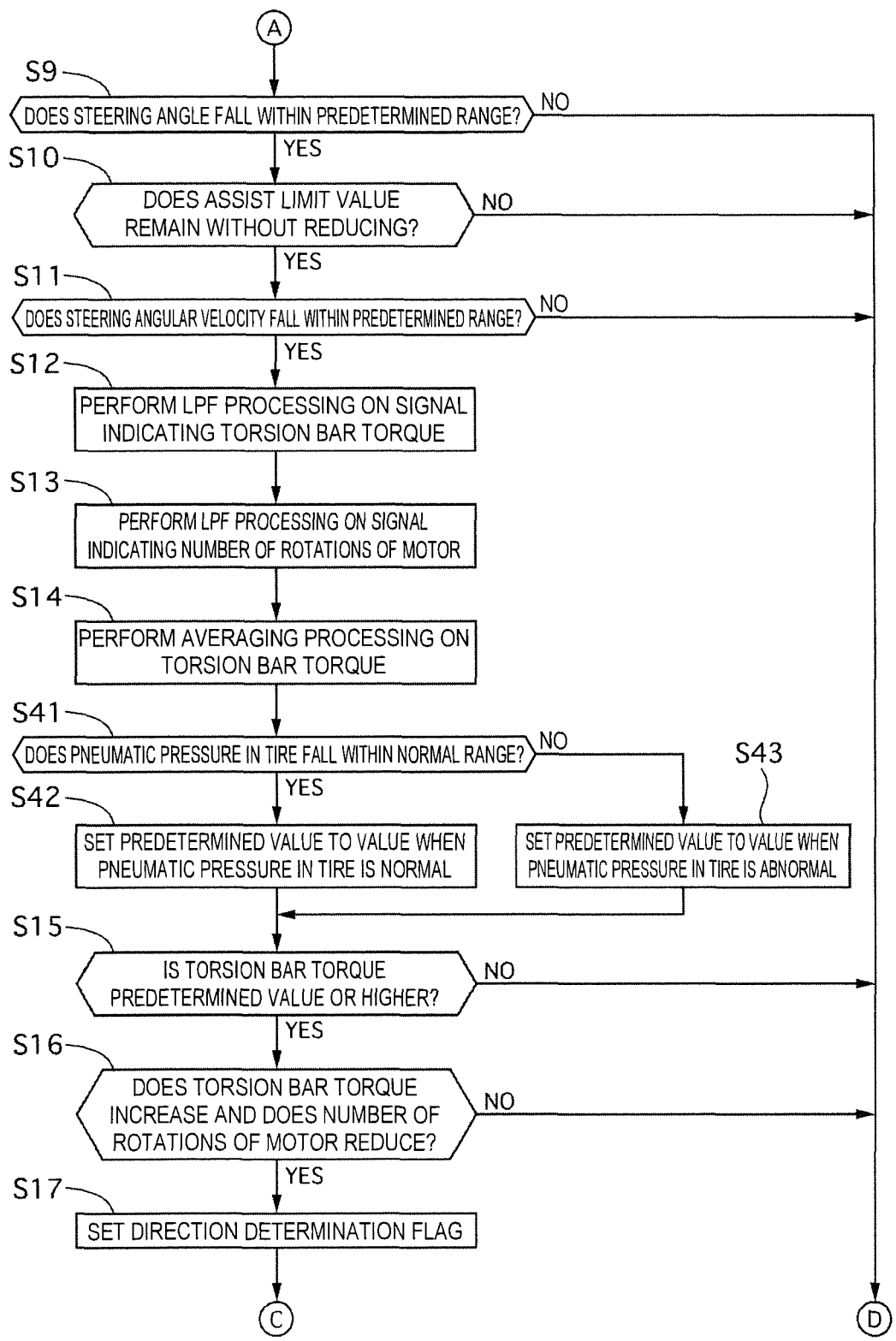
FIG. 10 is a flowchart illustrating the flow of the processing for controlling the detection of the rust abnormality according to the second embodiment.

FIGS. 5, 7, and 10 are flowcharts illustrating a flow of the processing for controlling the detection of the rust abnormality that is performed by the rust detection unit 31 according to the second embodiment. In the following description, the processing for controlling the detection of the rust abnormality will be described focusing on differences from this processing according to the first embodiment.

In step S41, the rust detection unit 31 determines whether the pneumatic pressure in the tire falls within the normal range. If the rust detection unit 31 determines YES, the processing proceeds to step S42. If the rust detection unit 31 determines NO, the processing proceeds to step S43.

In step S42, the rust detection unit 31 sets the predetermined value to be used in step S15 to a value when the pneumatic pressure in the tire is normal. The value when the pneumatic pressure in the tire is normal is set to be, for example, 5 [Nm].

In step S43, the rust detection unit 31 changes the predetermined value to be used in step S15 to a value when the pneumatic pressure in the tire is abnormal. The value when the pneumatic pressure in the tire is abnormal is a higher than the value when the pneumatic pressure in the tire is normal, and is set to be, for example, 6 [Nm].

The second embodiment can bring about the following advantageous effects, in addition to the advantageous effects of the first embodiment.

(18-11) In the power steering apparatus described in the above item (9-10), the control unit 6 includes the pneumatic signal input unit 37 to which the pneumatic warning signal is input. The pneumatic warning signal is the signal regarding the reduction in the pneumatic pressure in the tire. When the pneumatic warning signal is input, the rust detection unit 31 corrects the predetermined value to be compared with the average value of the torsion bar torque in the predetermined time period to the higher value (6 [Nm]) than the value (5 [Nm]) when the pneumatic warning signal is not input.

When the pneumatic pressure in the tire (especially a steering wheel) reduces, the operation load on the ball screw mechanism 4 increases, whereby the average value of the torsion bar torque in the predetermined time period may be 5 [Nm] or higher even without the rust generated on the ball screw mechanism 4. Therefore, when the pneumatic pressure in the tire deviates from the normal range, the correction of the predetermined value to be compared with the average value of the torsion bar torque to the higher value can achieve the detection of the abnormality while eliminating or reducing the influence on the operation load on the ball screw mechanism 4 due to the reduction in the pneumatic pressure in the tire. Therefore, the accuracy of the detection of the abnormality can be improved when the pneumatic pressure in the tire reduces.

Third Embodiment

A third embodiment is different from the first embodiment in terms of the processing for controlling the detection of the rust abnormality, in which the frequency range for determining the rust detection is corrected according to the number of rotations of the motor. Similar configurations to the first embodiment will not be illustrated and described herein.

[Processing for Controlling Detection of Rust Abnormality]

Figure 11:
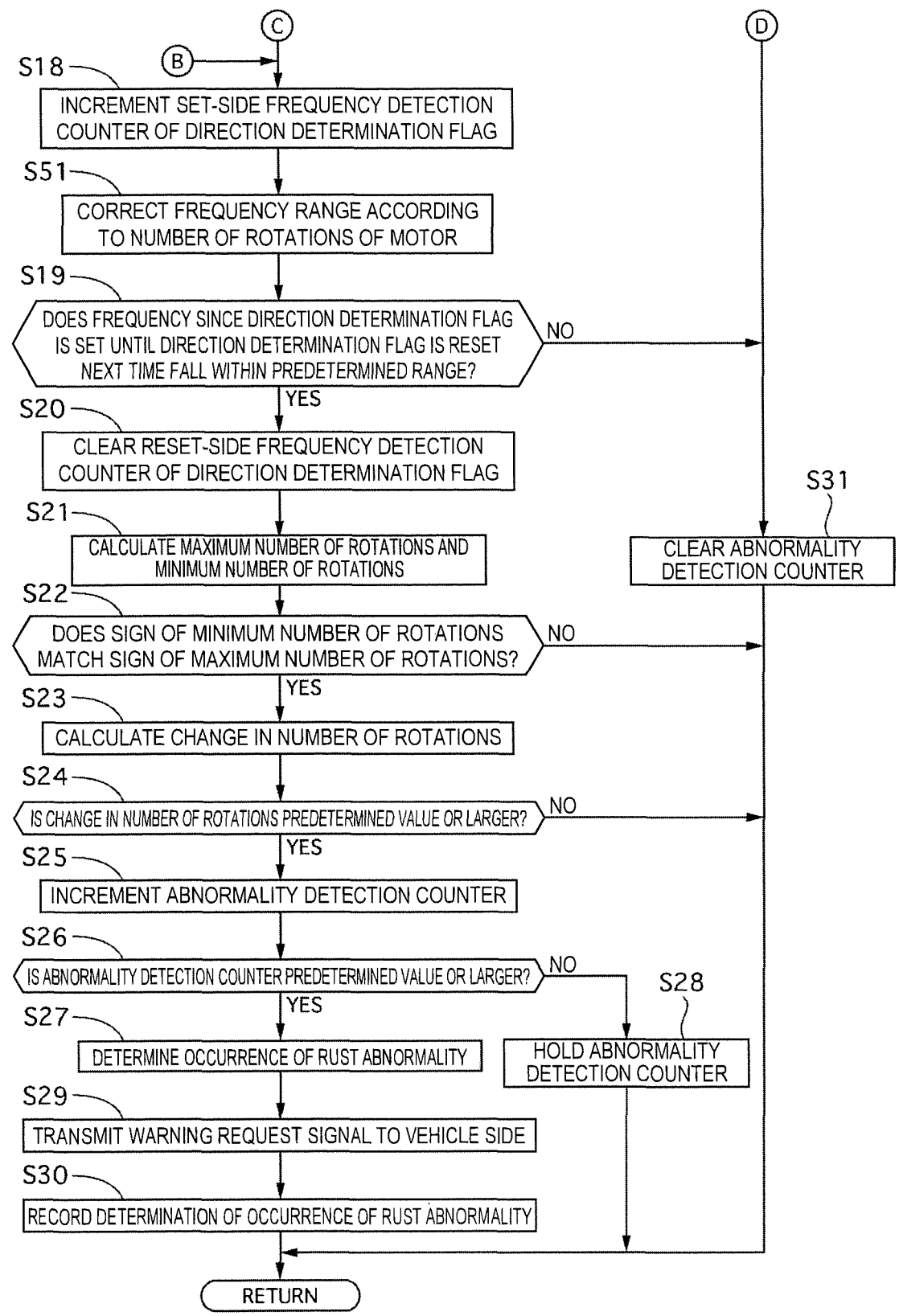
FIG. 11 is a flowchart illustrating the flow of the processing for controlling the detection of the rust abnormality according to the third embodiment.

FIGS. 5, 7, and 11 are flowcharts illustrating a flow of the processing for controlling the detection of the rust abnormality that is performed by the rust detection unit 31 according to the third embodiment. In the following description, the processing for controlling the detection of the rust abnormality will be described focusing on differences from the processing according to the first embodiment.

In step S51, the rust detection unit 31 corrects the predetermined range to be used in step S19 according to the number of rotations of the motor. The predetermined range is corrected to a higher value as the number of rotations of the motor increases. For example, the number of rotations of the motor are divided into three regions, a low speed region, an intermediate speed region, and a high speed region, and the predetermined range is set to 0.8 to 4.8 [Hz] when the motor rotates at a low speed, 1 to 5 [Hz] when the motor rotates at an intermediate speed, and 2 to 6 [Hz] when the motor rotates at a high speed.

The third embodiment can bring about the following advantageous effects, in addition to the advantageous effects of the first embodiment.

(19-8) In the power steering apparatus described in the above item (1-1), the rust detection unit 31 corrects the value of the predetermined frequency to the higher value as the number of rotations of the motor increases.

As the number of rotations of the motor or the steering angular velocity increases, the generation cycle of the change of the operation load on the ball screw mechanism 4 reduces. Therefore, the accuracy of the detection of the abnormality can be improved regardless of the number of rotations of the motor and the steering angular velocity, by changing the frequency range based on which the abnormality is determined according to the number of rotations of the motor.

Fourth Embodiment

A fourth embodiment is different from the first embodiment in terms of the processing for controlling the detection of the rust abnormality. Similar configurations to the first embodiment will not be illustrated and described herein.

The rust detection unit 31 according to the fourth embodiment inputs the vehicle speed in addition to the number of rotations of the motor, the torsion bar torque, and the steering angle, and detects the abnormality caused in connection with the generation of the rust on the ball screw mechanism 4, based on the number of rotations of the motor, the torsion bar torque, the steering angle, and the vehicle speed.

[Processing for Controlling Detection of Rust Abnormality]

Figure 12:
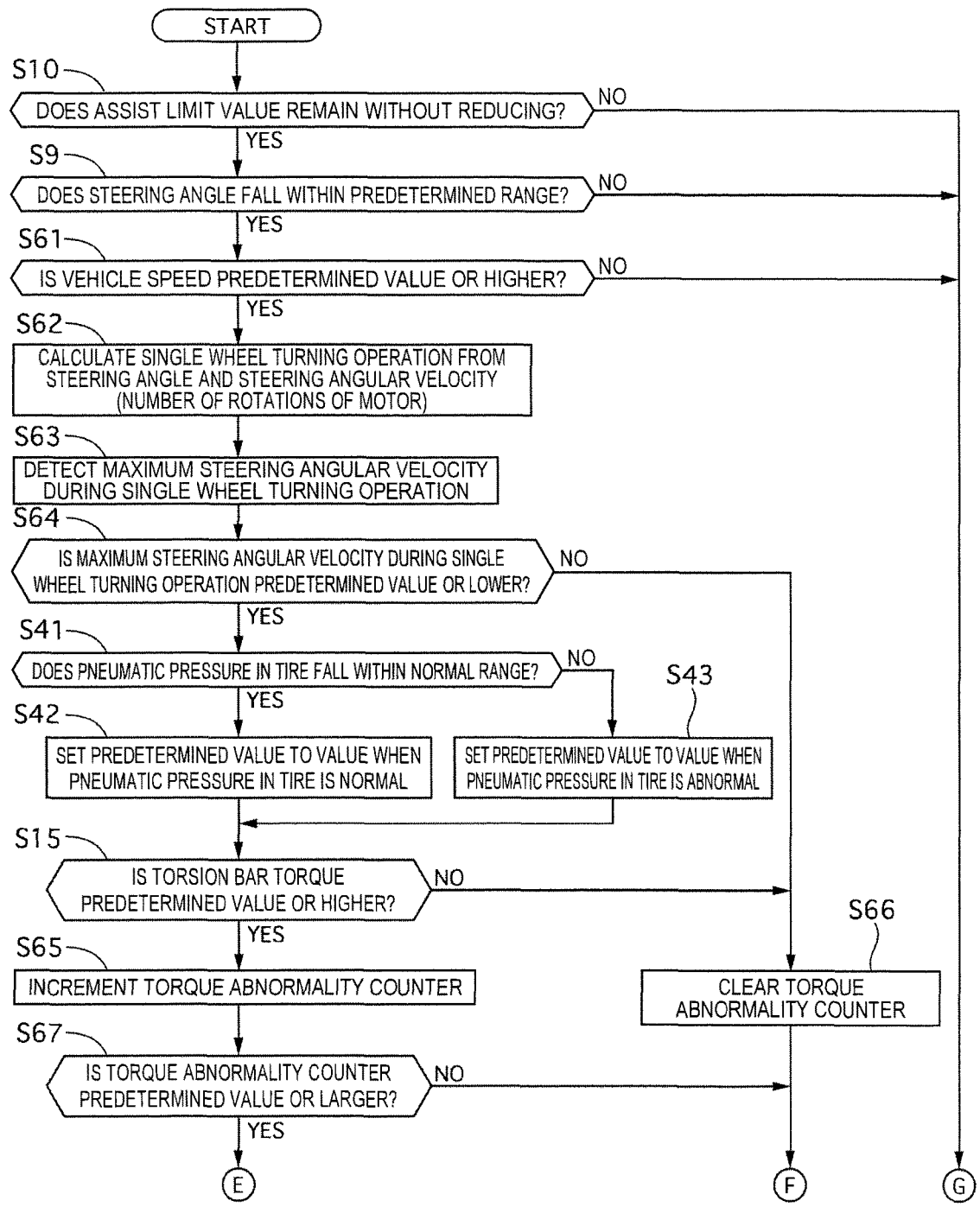
FIG. 12 is a flowchart illustrating a flow of the processing for controlling the detection of the rust abnormality according to a fourth embodiment.

FIGS. 12 and 13 are flowcharts illustrating a flow of the processing for controlling the detection of the rust abnormality that is performed by the rust detection unit 31 according to the fourth embodiment. Steps in which the rust detection unit 31 performs similar processing to the flowcharts illustrated in FIGS. 5, 6, 7, and 10 will be identified by the same step numbers, and will not be redundantly described.

If the rust detection unit 31 determines NO in step S10 or S9, the processing proceeds to step S76.

In step S61, the rust detection unit 31 determines whether the vehicle speed is a predetermined value or higher. If the rust detection unit 31 determines YES, the processing proceeds to step S62. If the rust detection unit 31 determines NO, the processing proceeds to step S76. The predetermined value is a speed that allows the rust detection unit 31 to determine that, for example, the vehicle is not subject to dry steering while being stationary or the vehicle does not run on a curb, and is set to be, for example, 10 [km/h]. If the vehicle speed is lower than the predetermined value, it is possible that the operation load on the ball screw mechanism 4 increases because the vehicle is subject to the dry steering or runs on a curb, whereby the rust detection unit 31 cancels the abnormality detection, thereby preventing or reducing false detection.

In step S62, the rust detection unit 31 calculates a single wheel turning operation from the steering angle and the steering angular velocity (or the number of rotations of the motor). The single wheel turning operation is defined to refer to a temporal section until the steering wheel returns to a steering angular neutral position again after being operated from the steering angular neutral position to the right or the left.

In step S63, the rust detection unit 31 detects a maximum steering angular velocity during the single wheel turning operation.

In step S64, the rust detection unit 31 determines whether the maximum steering angular velocity during the signal wheel turning operation is a predetermined value or lower. If the rust detection unit 31 determines YES, the processing proceeds to step S41. If the rust detection unit 31 determines NO, the processing proceeds to step S66. The predetermined value is a steering angular velocity at which the smoothness of the steering is lost or reduces in connection with the generation of the rust, and is set to be, for example, 300 [deg/sec]. Regarding this setting, the maximum steering angular velocity during the signal wheel turning operation is approximately 400 [deg/sec] at normal times when no abnormality, such as the rust, occurs in the ball screw mechanism 4. Therefore, the rust detection unit 31 can determine that the abnormality has occurred in the ball screw mechanism 4 if the maximum steering angular velocity is 300 [deg/sec] or lower.

In step S42, the rust detection unit 31 sets the value when the pneumatic pressure in the tire is normal to, for example, 8 [Nm].

In step S43, the rust detection unit 31 sets the value when the pneumatic pressure in the tire is abnormal to the higher value than when the pneumatic pressure in the tire is normal, such as 9 [Nm].

In step S15, the rust detection unit 31 determines whether the torsion bar torque is a predetermined value or higher. If the rust detection unit 31 determines YES, the processing proceeds to step S65. If the rust detection unit 31 determines NO, the processing proceeds to step S66. The predetermined value is set to be, for example, 8 [Nm]. Regarding this setting, a maximum value of the torsion bar torque during the single wheel turning operation is approximately 5 [Nm] if the steering angular velocity is in a range exceeding 45 [deg/sec] at normal times when no abnormality, such as the rust, occurs in the ball screw mechanism 4. The rust detection unit 31 can determine that the abnormality highly likely has occurred in the ball screw mechanism 4 if the torsion bar torque reaches or exceeds 8 [Nm].

In step S65, the rust detection unit 31 increments the torque abnormality counter.

In step S66, the rust detection unit 31 clears the torque abnormality counter.

In step S67, the rust detection unit 31 determines whether the torque abnormality counter is a predetermined value or larger. If the rust detection unit 31 determines YES, the processing proceeds to step S68. If the rust detection unit 31 determines NO, the processing proceeds to step S70. The predetermined value is set to be, for example, 10.

In step S68, the rust detection unit 31 holds a maximum steering angular velocity when the torsion bar torque reaches or exceeds the predetermined value (8 [Nm]).

In step S69, the rust detection unit 31 clears a normality determination counter.

In step S70, the rust detection unit 31 determines whether the abnormality detection counter is larger than 0. If the rust detection unit 31 determines YES, the processing proceeds to step S71. If the rust detection unit 31 determines NO, the processing proceeds to step S76.

In step S71, the rust detection unit 31 determines whether the steering angular velocity is higher than the maximum steering angular velocity when the torsion bar torque reaches or exceeds the predetermined value (8 [Nm]), and the torsion bar torque is the predetermined value or lower. If the rust detection unit 31 determines YES, the processing proceeds to step S72. If the rust detection unit 31 determines NO, the processing proceeds to step S76. The rust detection unit 31 can determined that no abnormality occurs in the ball screw mechanism 4 if the smoothness of the steering is neither lost nor reduces when the steering angular velocity is higher than the steering angular velocity when the smoothness of the steering is lost or reduces.

In step S72, the rust detection unit 31 increments the normality determination counter.

In step S73, the rust detection unit 31 determines whether the normality determination counter is a predetermined value or larger. If the rust detection unit 31 determines YES, the processing proceeds to step S74. If the rust detection unit 31 determines NO, the processing proceeds to step S76. The predetermined value is set to be, for example, 10.

In step 74, the rust detection unit 31 clears the abnormality detection counter.

In step S75, the rust detection unit 31 clears the maximum steering angular velocity when the torsion bar torque reaches or exceeds the predetermined value.

In step S76, the rust detection unit 31 holds the normality determination counter.

[Regarding Method for Detecting Rust Abnormality According to Fourth Embodiment]

The operation load on the ball screw mechanism 4 reduces in a state where the number of rotations of the motor or the steering angular velocity is high, similarly to when the vehicle is running on a low μ road surface or running at a high speed. Therefore, the increase in the torsion bar torque in this state means that the abnormality has highly likely occurred in the ball screw mechanism 4 due to the rust or the like. Therefore, the rust abnormality can be detected without use of the sensor for detecting the abnormality, by determining the rust abnormality if the vehicle is kept in the state where the steering angular velocity is high and the torsion bar torque is high. Further, the detection of the rust abnormality is refrained from in the states where the vehicle is little steered, the vehicle is forcibly steered by the driver, the vehicle speed is the predetermined value or lower, the steering angular velocity is excessively high, and the assist limitation is exerted, which contributes to preventing or reducing the confusion with the increase in the torsion bar torque due to another cause (for example, because the vehicle is subject to the dry steering or runs on a curb), thereby succeeding in improving the accuracy of the detection of the abnormality. The power steering apparatus may be configured to detect the abnormality in the apparatus based on the number of rotations of the motor instead of the steering angular velocity.

The fourth embodiment can bring about the following advantageous effects.

(20-20) The power steering apparatus includes the steering mechanism 2 including the steering shaft 7 configured to rotate along with the rotation of the steering wheel and the rack bar 8 configured to be axially displaced according to the rotation of the steering shaft 7 and made from the ferrous metallic material, the electric motor 3 configured to provide the steering force to the steering mechanism 2, and the speed reducer provided between the steering mechanism 2 and the electric motor 3 and configured to transmit the rotational force of the electric motor 3 to the steering mechanism 2. The speed reducer includes the ball screw mechanism 4. The ball screw mechanism 4 includes the wheel turning shaft-side ball screw groove 21 provided on the outer peripheral side of the rack bar 8 and having the helical groove shape, the nut 22 formed annularly so as to surround the rack bar 8 and made from the ferrous metallic material while being provided rotatably relative to the rack bar 8, and the nut-side ball screw groove 23 provided on the inner peripheral side of the nut 22 and having the helical groove shape. The nut-side ball screw groove 23 forms the ball circulation groove 26 together with the wheel turning shaft-side ball screw groove 21. The ball screw mechanism 4 further includes the plurality of balls 24 made from the ferrous metallic material and loaded in the ball circulation groove 26, and the tube 25 provided on the outer side of the nut 22 in the radial direction with respect to the rotational axis of the nut 22 and connecting one end side and the other end side of the ball circulation groove 26 so as to allow the plurality of balls 24 to be circulated from the one end side to the other end side of the ball circulation groove 26. The power steering apparatus further includes the torque sensor 5 configured to detect the torsion bar torque generated at the steering mechanism 2, the control unit 6 configured to calculate, based on the torsion bar torque, the motor torque instruction value for controlling the driving of the electric motor 3 and output the calculated motor torque instruction value to the electric motor 3, and the abnormality detection circuit provided in the control unit 6 and configured to detect the abnormality in the apparatus when the steering angular velocity is within the predetermined range (45 to 300 [deg/sec]) and the torsion bar torque is the predetermined value (8 [Nm]) or higher.

Therefore, the abnormality in the apparatus can be highly accurately detected without use of the sensor for detecting the abnormality.

Other Embodiments

Having described the embodiments for implementing the present invention based on the examples thereof, the specific configuration of the present invention is not limited to the configuration described in the embodiments, and the present invention also includes a design modification and the like thereof made within a scope that does not depart from the spirit of the present invention.

For example, in the embodiments, the detection of the abnormality has been described referring to the example in which the abnormality in the apparatus is detected based on whether there is the periodic change in the number of rotations of the motor within the predetermined frequency range, but the steering angular velocity or the torsion bar torque may be used instead of the number of rotations of the motor.

In the embodiments, the detection of the abnormality has been described referring to the example in which the abnormality in the apparatus is detected based on whether there is a synchronization between increase and reduction of the torsion bar torque, and reduction and increase of the number of rotations of the motor, but the steering angular velocity may be used instead of the number of rotations of the motor. In the third embodiment, the correction of the value of the predetermined frequency of the change in the number of rotations of the motor has been described referring to the example in which this value is corrected to a higher value as the number of rotations of the motor increases, but the steering angular velocity may be used instead of the number of rotations of the motor.

The signal indicating the steering angular velocity may be subjected to the low-pass filter processing.

In the fourth embodiment, the detection of the abnormality has been described referring to the example in which the abnormality in the apparatus is detected when the steering angular velocity falls within the predetermined range and the torsion bar torque is the predetermined value or higher, but the number of rotations of the motor may be used instead of the steering angular velocity.

In any of the embodiments, the power steering apparatus may be configured in such a manner that the present invention is applied when the power steering apparatus is equipped with the sensor for detecting the abnormality but a failure has occurred in this sensor and the abnormality cannot be detected by the sensor.

In the following description, one example of technical ideas recognizable from the embodiments will be described.

(a1) A power steering apparatus includes a steering mechanism including a steering shaft configured to rotate along with a rotation of a steering wheel and a rack bar configured to be axially displaced according to the rotation of the steering shaft and made from a ferrous metallic material, an electric motor configured to provide a steering force to the steering mechanism, and a speed reducer provided between the steering mechanism and the electric motor and configured to transmit a rotational force of the electric motor to the steering mechanism. The speed reducer includes a ball screw mechanism. The ball screw mechanism includes a wheel turning shaft-side ball screw groove provided on an outer peripheral side of the rack bar and having a helical groove shape, a nut formed annularly so as to surround the rack bar and made from a ferrous metallic material while being provided rotatably relative to the rack bar, and a nut-side ball screw groove provided on an inner peripheral side of the nut and having a helical groove shape. The nut-side ball screw groove forms a ball circulation groove together with the wheel turning shaft-side ball screw groove. The ball screw mechanism further includes a plurality of balls made from a ferrous metallic material and loaded in the ball circulation groove, and a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove. The power steering apparatus further includes a torque sensor configured to detect a steering torque generated at the steering mechanism, a control unit configured to calculate, based on the steering torque, an instruction current value for controlling driving of the electric motor and output the calculated instruction current value to the electric motor, and an abnormality detection circuit provided in the control unit and configured to detect an abnormality in the power steering apparatus based on whether there is a periodic change within a predetermined frequency range with respect to the number of rotations of the electric motor, a steering velocity, which is the number of rotations of the steering shaft, or the steering torque.

Therefore, the abnormality in the apparatus can be highly accurately detected without requiring addition of a sensor for detecting the abnormality.

(a2) In the power steering apparatus described in (a1), the steering mechanism includes a torsion bar provided at the steering shaft. The torque sensor detects the steering torque based on a torsional amount of the torsion bar. The predetermined frequency in the abnormality detection circuit is set to a frequency lower than a resonant frequency of the torsion bar.

Therefore, confusion with resonance of the torsion bar can be prevented or reduced.

(a3) In the power steering apparatus described in (a2), the predetermined frequency in the abnormality detection circuit is set to 5 hertz or lower.

The confusion with the resonance of the torsion bar can be prevented or reduced, by setting the predetermined frequency in the abnormality detection circuit to 5 hertz or lower if taking into consideration the resonant frequency of the torsion bar used in the power steering apparatus.

(a4) In the power steering apparatus described in (a2), the predetermined frequency in the abnormality detection circuit is set to 1 hertz or higher.

No periodic change occurs in an operation load on the speed reducer due to the abnormality in the apparatus in a state where the vehicle is running straight, in which the predetermined frequency is lower than 1 hertz. Therefore, accuracy of the detection of the abnormality can be improved by refraining from detecting the abnormality in the state where the vehicle is running straight.

(a5) In the power steering apparatus described in any of (a1) to (a4), the abnormality detection circuit detects the abnormality in the power steering apparatus based on the steering torque and the number of rotations of the motor or the steering velocity.

When a periodic increase has occurred in the operation load on the ball screw mechanism 4 due to generation of rust, the number of rotations of the motor and a steering angular velocity reduce while a torsion bar torque increases. The accuracy of the detection of the abnormality can be improved by further taking a combination of these reduction and increase into consideration.

(a6) In the power steering apparatus described in any of (a1) to (a5), the abnormality detection circuit detects the abnormality in the power steering apparatus based on a cycle in which the number of rotations of the electric motor falls below a first predetermined value, a cycle in which the steering velocity falls below a second predetermined value, or a cycle in which the steering torque exceeds a third predetermined value.

When the periodic increase has occurred in the operation load on the ball screw mechanism 4 due to the generation of the rust, the number of rotations of the motor and the steering angular velocity reduce to fall below values (the first predetermined value and the second predetermined value) that they are predicted to have, respectively, at normal times when no rust is generated, and increase after that. On the other hand, the torsion bar torque increases to exceed a value (the third predetermined value) that the torsion bar torque is predicted to have at normal times when no rust is generated, and reduces after that. The accuracy of the detection of the abnormality can be improved by further taking the combination of these reduction and increase into consideration.

(a7) In the power steering apparatus described in any of (a1) to (a6), the abnormality detection circuit detects the abnormality in the power steering apparatus when the steering velocity is a fourth predetermined value or higher and a fifth predetermined value or lower. The fifth predetermined value is higher than the fourth predetermined value.

Therefore, no periodic change occurs in the operation load on the speed reducer due to the abnormality in the apparatus in a state where the vehicle is little steered (the steering velocity is lower than the fourth predetermined value) and a state in which the vehicle is forcibly steered by a driver (the steering velocity exceeds the fifth predetermined value). Therefore, the accuracy of the detection of the abnormality can be improved by refraining from detecting the rust abnormality in the non-steering state and the forcible steering state.

(a8) In the power steering apparatus described in any of (a1) to (a7), the abnormality detection circuit corrects a value of the predetermined frequency to a higher value as the number of rotations of the motor or the steering velocity increases.

As the number of rotations of the motor or the steering angular velocity increases, the cycle in which the operation load on the ball screw mechanism is generated reduces. Therefore, the accuracy of the detection of the abnormality can be improved regardless of the number of rotations of the motor and the steering angular velocity, by changing the frequency range based on which the abnormality is determined according to the number of rotations of the motor.

(a9) The power steering apparatus described in any of (a1) to (a8) further includes a low-pass filter provided in the control unit. The abnormality detection circuit detects the abnormality in the power steering apparatus based on a signal indicating the number of rotations of the electric motor, the steering velocity, or the steering torque that is subjected to filter processing by the low-pass filter.

Therefore, high-frequency noise is removed by the low-pass filter from the signal indicating the number of rotations of the electric motor, the steering velocity, or the steering torque, so that the accuracy of the detection of the abnormality can be improved.

(a10) In the power steering apparatus described in any of (a1) to (a9), the abnormality detection circuit detects the abnormality in the power steering apparatus when an average value of the steering torque in a predetermined time period is higher than a predetermined value.

When the abnormality has occurred in the operation of the ball screw mechanism, the average value of the steering torque also increases. Therefore, the accuracy of the detection of the abnormality can be improved by further taking this increase in the steering torque into consideration.

(a11) In the power steering apparatus described in (a10), the control unit includes a pneumatic signal input unit to which a pneumatic warning signal is input. The pneumatic warning signal is a signal regarding a reduction in a pneumatic pressure in a tire. When the pneumatic warning signal is input, the abnormality detection circuit corrects the predetermined value to be compared with the average value of the steering torque in the predetermined time period to a higher value than when the pneumatic warning signal is not input.

A steering load increases even due to a reduction in the pneumatic pressure in the tier in the state where the pneumatic pressure warning signal is input. However, configuring the power steering apparatus in the above-described manner can prevent or reduce confusion with this increase in the steering load due to the reduction in the pneumatic pressure.

(a12) In the power steering apparatus described in any of (a1) to (a11), the abnormality detection circuit does not use information indicating the number of rotations of the motor, the steering velocity, or the steering torque in a state where the rack bar is displaced to around a stroke end, for the detection of the abnormality in the power steering apparatus.

The number of rotations of the motor and the steering angular velocity reduce to almost zero when the rack bar is located around the stroke end, and the steering torque becomes higher than usual in an abutting state. These can cause false detection, whereby the accuracy of the detection of the abnormality can be improved by refraining from using the information when the rack bar is located around the stroke end, for the detection of the abnormality.

(a13) In the power steering apparatus described in any of (a1) to (a12), when detecting the abnormality in the power steering apparatus, the abnormality detection circuit outputs a signal regarding the abnormality in the power steering apparatus to an on-board device for notifying a driver of the abnormality.

Therefore, when the abnormality in the apparatus is detected, the driver is notified thereof with a warning light or a warning sound, which can enhance safety.

(a14) In the power steering apparatus described in any of (a1) to (a13), the abnormality detection circuit does not use information indicating the number of rotations of the motor, the steering velocity, or the steering torque in a state where a limitation is imposed on the instruction current value due to a cause other than the abnormality in the power steering apparatus that is detected by the abnormality detection circuit.

In a state where the limitation is imposed on the instruction current value due to a different cause from the abnormality in the apparatus, the number of rotations of the motor, the steering velocity, and the steering torque may be affected due to this limitation. They may become a cause for false detection, whereby the accuracy of the detection of the abnormality can be improved by refraining from using the information in this state for the detection of the abnormality.

(a15) A control circuit for a power steering apparatus is provided. The power steering apparatus includes a steering mechanism including a steering shaft configured to rotate along with a rotation of a steering wheel and a rack bar configured to be axially displaced according to the rotation of the steering shaft and made from a ferrous metallic material, an electric motor configured to provide a steering force to the steering mechanism, and a speed reducer provided between the steering mechanism and the electric motor and configured to transmit a rotational force of the electric motor to the steering mechanism. The speed reducer includes a ball screw mechanism. The ball screw mechanism includes a wheel turning shaft-side ball screw groove provided on an outer peripheral side of the rack bar and having a helical groove shape, a nut formed annularly so as to surround the rack bar and made from a ferrous metallic material while being provided rotatably relative to the rack bar, and a nut-side ball screw groove provided on an inner peripheral side of the nut and having a helical groove shape. The nut-side ball screw groove forms a ball circulation groove together with the wheel turning shaft-side ball screw groove. The ball screw mechanism further includes a plurality of balls made from a ferrous metallic material and loaded in the ball circulation groove, and a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove. The power steering apparatus further includes a torque sensor configured to detect a steering torque generated at the steering mechanism. The control circuit for the power steering apparatus includes a motor control circuit configured to calculate, based on the steering torque, an instruction current value for controlling driving of the electric motor and output the calculated instruction current value to the electric motor, and an abnormality detection circuit configured to detect an abnormality in the power steering apparatus based on whether there is a periodic change within a predetermined frequency range with respect to the number of rotations of the electric motor, a steering velocity, which is the number of rotations of the steering shaft, or the steering torque.

Therefore, the abnormality in the apparatus can be highly accurately detected without requiring addition of a sensor for detecting the abnormality.

(a16) In the control circuit for the power steering apparatus described in (a15), the steering mechanism includes a torsion bar provided at the steering shaft. The torque sensor detects the steering torque based on a torsional amount of the torsion bar. The predetermined frequency in the abnormality detection circuit is set to a frequency lower than a resonant frequency of the torsion bar.

Therefore, confusion with resonance of the torsion bar can be prevented or reduced.

(a17) In the control circuit for the power steering apparatus described in (a15) or (a16), the abnormality detection circuit detects the abnormality in the power steering apparatus based on the steering torque and the number of rotations of the motor or the steering velocity.

When a periodic increase has occurred in the operation load on the speed reducer due to the abnormality in the apparatus, the number of rotations of the motor and the steering velocity reduce while the steering torque increases. The accuracy of the detection of the abnormality can be improved by further taking a combination of these reduction and increase into consideration.

(a18) In the control circuit for the power steering apparatus described in any of (a15) and (a17), the abnormality detection circuit detects the abnormality in the power steering apparatus based on a cycle in which the number of rotations of the electric motor falls below a first predetermined value, a cycle in which the steering velocity falls below a second predetermined value, or a cycle in which the steering torque exceeds a third predetermined value.

When the periodic increase has occurred in the operation load on the speed reducer due to the abnormality in the apparatus, the number of rotations of the motor and the steering velocity reduce to fall below values (the first predetermined value and the second predetermined value) that they are predicted to have, respectively, at normal times, and increase after that. On the other hand, the steering torque increases to exceed a value (the third predetermined value) that the steering torque is predicted to have at normal times, and reduces after that. The accuracy of the detection of the abnormality can be improved by further taking the combination of these reduction and increase into consideration.

(a19) In the control circuit for the power steering apparatus described in any of (a15) to (a18), the abnormality detection circuit detects the abnormality in the power steering apparatus when the steering velocity is a fourth predetermined value or higher and a fifth predetermined value or lower. The fifth predetermined value is higher than the fourth predetermined value.

Therefore, no periodic change occurs in the operation load on the speed reducer due to the abnormality in the apparatus in a state where the vehicle is little steered (the steering velocity is the fourth predetermined value or lower) and a state in which the vehicle is forcibly steered by a driver (the steering velocity exceeds the fifth predetermined value). Therefore, the accuracy of the detection of the abnormality can be improved by refraining from detecting the rust abnormality in the non-steering state and the forcible steering state.

(a20) A power steering apparatus includes a steering mechanism including a steering shaft configured to rotate along with a rotation of a steering wheel and a rack bar configured to be axially displaced according to the rotation of the steering shaft and made from a ferrous metallic material, an electric motor configured to provide a steering force to the steering mechanism, and a speed reducer provided between the steering mechanism and the electric motor and configured to transmit a rotational force of the electric motor to the steering mechanism. The speed reducer includes a ball screw mechanism. The ball screw mechanism includes a wheel turning shaft-side ball screw groove provided on an outer peripheral side of the rack bar and having a helical groove shape, a nut formed annularly so as to surround the rack bar and made from a ferrous metallic material while being provided rotatably relative to the rack bar, and a nut-side ball screw groove provided on an inner peripheral side of the nut and having a helical groove shape. The nut-side ball screw groove forms a ball circulation groove together with the wheel turning shaft-side ball screw groove. The ball screw mechanism further includes a plurality of balls made from a ferrous metallic material and loaded in the ball circulation groove, and a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove. The power steering apparatus further includes a torque sensor configured to detect a steering torque generated at the steering mechanism, a control unit configured to calculate, based on the steering torque, an instruction current value for controlling driving of the electric motor and output the calculated instruction current value to the electric motor, and an abnormality detection circuit provided in the control unit and configured to detect an abnormality in the power steering apparatus when the number of rotations of the electric motor falls within a predetermined rotation number range or a steering velocity falls within a predetermined range, and the steering torque is a predetermined value or higher. The steering velocity is the number of rotations of the steering shaft.

Therefore, the abnormality in the apparatus can be highly accurately detected without requiring addition of a sensor for detecting the abnormality.

According to the above-described embodiments, the abnormality in the apparatus can be detected without requiring the addition of the sensor for detecting the abnormality.

Having described merely several embodiments of the present invention, it is apparent to those skilled in the art that the embodiments described as examples can be modified or improved in various manners without substantially departing from the novel teachings and advantages of the present invention. Therefore, such embodiments modified or improved in various manners are intended to be also contained in the technical scope of the present invention.

Having described the embodiments of the present invention based on several examples, the above-described embodiments of the present invention are intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-193902 filed on Sep. 24, 2014. The entire disclosure of Japanese Patent Application No. 2014-193902 filed on Sep. 24, 2014 including the specification, the claims, the drawings, and the abstract is incorporated herein by reference in its entirety.

The entire disclosure of Japanese Patent Application Public Disclosure No. 2006-111032 (PTL 1) including the specification, the claims, the drawings, and the abstract is incorporated herein by reference in its entirety.

REFERENCE SIGNS LIST 1 power steering apparatus
2 steering mechanism
3 electric motor
4 ball screw mechanism
5 torque sensor
6 control unit
7 steering shaft
8 rack bar
21 wheel turning shaft-side ball screw groove
22 nut
23 nut-side ball screw groove
24 ball
25 tube (circulation member)
29 assist control unit (motor control circuit)
31 rust detection unit (abnormality detection circuit)

The invention claimed is:

1. A power steering apparatus comprising:
a steering mechanism including a steering shaft configured to rotate along with a rotation of a steering wheel, and a rack bar configured to be axially displaced according to the rotation of the steering shaft and made from a ferrous metallic material;
an electric motor configured to provide a steering force to the steering mechanism;
a speed reducer provided between the steering mechanism and the electric motor and configured to transmit a rotational force of the electric motor to the steering mechanism, the speed reducer including a ball screw mechanism,
the ball screw mechanism including
a wheel turning shaft-side ball screw groove provided on an outer peripheral side of the rack bar and having a helical groove shape,
a nut formed annularly so as to surround the rack bar and made from a ferrous metallic material, the nut being provided rotatably relative to the rack bar,
a nut-side ball screw groove provided on an inner peripheral side of the nut and having a helical groove shape, the nut-side ball screw groove forming a ball circulation groove together with the wheel turning shaft-side ball screw groove,
a plurality of balls made from a ferrous metallic material and loaded in the ball circulation groove, and
a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove,
the power steering apparatus further comprising:
a torque sensor configured to detect a steering torque generated at the steering mechanism;
a control unit configured to calculate, based on the steering torque, an instruction current value for controlling driving of the electric motor, and output the calculated instruction current value to the electric motor; and
an abnormality detection circuit provided in the control unit and configured to detect an abnormality in the power steering apparatus based on whether there is a periodic change within a predetermined frequency range with respect to the number of rotations of the electric motor, a steering velocity, which is the number of rotations of the steering shaft, or the steering torque,
wherein the steering mechanism includes a torsion bar provided at the steering shaft,
wherein the torque sensor is configured to detect the steering torque based on a torsional amount of the torsion bar, and
wherein the predetermined frequency in the abnormality detection circuit is set to a frequency lower than a resonant frequency of the torsion bar.

2. The power steering apparatus according to claim 1, wherein the predetermined frequency in the abnormality detection circuit is set to 5 hertz or lower.

3. The power steering apparatus according to claim 1, wherein the predetermined frequency in the abnormality detection circuit is set to 1 hertz or higher.

4. The power steering apparatus according to claim 1, wherein the abnormality detection circuit is configured to detect the abnormality in the power steering apparatus based on the steering torque and the number of rotations of the motor or the steering velocity.

5. The power steering apparatus according to claim 1, wherein the abnormality detection circuit is configured to detect the abnormality in the power steering apparatus based on a cycle in which the number of rotations of the electric motor falls below a first predetermined value, a cycle in which the steering velocity falls below a second predetermined value, or a cycle in which the steering torque exceeds a third predetermined value.

6. The power steering apparatus according to claim 1, wherein the abnormality detection circuit is configured to detect the abnormality in the power steering apparatus when the steering velocity is a fourth predetermined value or higher and a fifth predetermined value or lower, the fifth predetermined value being higher than the fourth predetermined value.

7. The power steering apparatus according to claim 1, wherein the abnormality detection circuit is configured to correct a value of the predetermined frequency to a higher value as the number of rotations of the motor or the steering velocity increases.

8. The power steering apparatus according to claim 1, wherein the abnormality detection circuit is configured to detect the abnormality in the power steering apparatus when an average value of the steering torque in a predetermined time period is higher than a predetermined value.

9. The power steering apparatus according to claim 1, wherein the control unit includes a pneumatic signal input unit to which a pneumatic warning signal is input, the pneumatic warning signal being a signal regarding a reduction in a pneumatic pressure in a tire, and
wherein, when the pneumatic warning signal is input, the abnormality detection circuit is configured to correct the predetermined value to be compared with an average value of the steering torque in a predetermined time period to a higher value than when the pneumatic warning signal is not input.

10. The power steering apparatus according to claim 1, wherein the abnormality detection circuit is configured to not use information indicating the number of rotations of the motor, the steering velocity, or the steering torque in a state where the rack bar is displaced to around a stroke end, for the detection of the abnormality in the power steering apparatus.

11. The power steering apparatus according to claim 1, wherein, when detecting the abnormality in the power steering apparatus, the abnormality detection circuit is configured to output a signal regarding the abnormality in the power steering apparatus to an on-board device for notifying a driver of the abnormality.

12. The power steering apparatus according to claim 1, wherein the abnormality detection circuit is configured to not use information indicating the number of rotations of the motor, the steering velocity, or the steering torque in a state where a limitation is imposed on the instruction current value due to a cause other than the abnormality in the power steering apparatus that is detected by the abnormality detection circuit.

13. A control circuit for a power steering apparatus, the power steering apparatus including
a steering mechanism including a steering shaft configured to rotate along with a rotation of a steering wheel, and a rack bar configured to be axially displaced according to the rotation of the steering shaft and made from a ferrous metallic material,
an electric motor configured to provide a steering force to the steering mechanism,
a speed reducer provided between the steering mechanism and the electric motor and configured to transmit a rotational force of the electric motor to the steering mechanism, the speed reducer including a ball screw mechanism,
the ball screw mechanism including
a wheel turning shaft-side ball screw groove provided on an outer peripheral side of the rack bar and having a helical groove shape,
a nut formed annularly so as to surround the rack bar and made from a ferrous metallic material, the nut being provided rotatably relative to the rack bar,
a nut-side ball screw groove provided on an inner peripheral side of the nut and having a helical groove shape, the nut-side ball screw groove forming a ball circulation groove together with the wheel turning shaft-side ball screw groove,
a plurality of balls made from a ferrous metallic material and loaded in the ball circulation groove, and
a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove,
the power steering apparatus further including a torque sensor configured to detect a steering torque generated at the steering mechanism,
the control circuit comprising:
a motor control circuit configured to calculate, based on the steering torque, an instruction current value for controlling driving of the electric motor, and output the calculated instruction current value to the electric motor; and
an abnormality detection circuit configured to detect an abnormality in the power steering apparatus based on whether there is a periodic change within a predetermined frequency range with respect to the number of rotations of the electric motor, a steering velocity, which is the number of rotations of the steering shaft, or the steering torque,
wherein the steering mechanism includes a torsion bar provided at the steering shaft,
wherein the torque sensor is configured to detect the steering torque based on a torsional amount of the torsion bar, and
wherein the predetermined frequency in the abnormality detection circuit is set to a frequency lower than a resonant frequency of the torsion bar.

14. The control circuit for the power steering apparatus according to claim 13, wherein the abnormality detection circuit is configured to detect the abnormality in the power steering apparatus based on the steering torque and the number of rotations of the motor or the steering velocity.

15. The control circuit for the power steering apparatus according to claim 13, wherein the abnormality detection circuit is configured to detect the abnormality in the power steering apparatus based on a cycle in which the number of rotations of the electric motor falls below a first predetermined value, a cycle in which the steering velocity falls below a second predetermined value, or a cycle in which the steering torque exceeds a third predetermined value.

16. The control circuit for the power steering apparatus according to claim 13, wherein the abnormality detection circuit is configured to detect the abnormality in the power steering apparatus when the steering velocity is a fourth predetermined value or higher and a fifth predetermined value or lower, the fifth predetermined value being higher than the fourth predetermined value.

17. A power steering apparatus comprising:
a steering mechanism including a steering shaft configured to rotate along with a rotation of a steering wheel, and a rack bar configured to be axially displaced according to the rotation of the steering shaft and made from a ferrous metallic material;
an electric motor configured to provide a steering force to the steering mechanism;
a speed reducer provided between the steering mechanism and the electric motor and configured to transmit a rotational force of the electric motor to the steering mechanism, the speed reducer including a ball screw mechanism,
the ball screw mechanism including
a wheel turning shaft-side ball screw groove provided on an outer peripheral side of the rack bar and having a helical groove shape,
a nut formed annularly so as to surround the rack bar and made from a ferrous metallic material, the nut being provided rotatably relative to the rack bar,
a nut-side ball screw groove provided on an inner peripheral side of the nut and having a helical groove shape, the nut-side ball screw groove forming a ball circulation groove together with the wheel turning shaft-side ball screw groove,
a plurality of balls made from a ferrous metallic material and loaded in the ball circulation groove, and
a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove, the power steering apparatus further comprising:
- a torque sensor configured to detect a steering torque generated at the steering mechanism;
- a control unit configured to calculate, based on the steering torque, an instruction current value for controlling driving of the electric motor, and output the calculated instruction current value to the electric motor;
- an abnormality detection circuit provided in the control unit and configured to detect an abnormality in the power steering apparatus based on whether there is a periodic change within a predetermined frequency range with respect to the number of rotations of the electric motor, a steering velocity, which is the number of rotations of the steering shaft, or the steering torque; and
- a low-pass filter provided in the control unit, wherein the abnormality detection circuit is configured to detect the abnormality in the power steering apparatus based on a signal indicating the number of rotations of the electric motor, the steering velocity, or the steering torque that is subjected to filter processing by the low-pass filter.

* * * * *